United States Patent
Bakopoulos et al.

(10) Patent No.: US 11,368,768 B2
(45) Date of Patent: Jun. 21, 2022

(54) OPTICAL NETWORK SYSTEM

(71) Applicant: MELLANOX TECHNOLOGIES, LTD., Yokneam (IL)

(72) Inventors: Paraskevas Bakopoulos, Ilion (GR); Ioannis (Giannis) Patronas, Piraeus (GR); Eitan Zahavi, Zichron Yaakov (IL); Elad Mentovich, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 127 days.

(21) Appl. No.: 16/823,387

(22) Filed: Mar. 19, 2020

(65) Prior Publication Data
US 2021/0176543 A1 Jun. 10, 2021

(30) Foreign Application Priority Data
Dec. 5, 2019 (GR) .............................. 20190100546

(51) Int. Cl.
*H04Q 11/00* (2006.01)
*H04Q 11/04* (2006.01)

(52) U.S. Cl.
CPC ..... *H04Q 11/0005* (2013.01); *H04Q 11/0066* (2013.01); *H04Q 11/0071* (2013.01);
(Continued)

(58) Field of Classification Search
CPC ........... H04Q 11/0005; H04Q 11/0066; H04Q 11/0071; H04Q 11/0421;
(Continued)

(56) References Cited

U.S. PATENT DOCUMENTS 5,850,398 A * 12/1998 King, Jr. ............ H04Q 11/0478
370/395.43
5,905,587 A * 5/1999 Maeno ............... H04Q 11/0001
398/1

(Continued)

FOREIGN PATENT DOCUMENTS

EP 2306664 A1 4/2011

OTHER PUBLICATIONS

Bakopoulos et al., "Nephele: An end-to-end scalable and dynamically reconfigurable optical architecture for application-aware sdn cloud data centers", IEEE Communications Magazine, vol. 56, No. 2, pp. 178-188, Feb. 2018.

(Continued)

*Primary Examiner* — Dibson J Sanchez
(74) *Attorney, Agent, or Firm* — Kligler & Associates Patent Attorneys Ltd

(57) ABSTRACT

In one embodiment, an optical network system including a plurality of optical switches configured to switch beams of light which are modulated to carry information, a plurality of host computers comprising respective optical network interface controllers (NICs), optical fibers connecting the optical NICs and the optical switches forming an optically-switched communication network, over which optical circuit connections are established between pairs of the optical NICs over ones of the optical fibers via ones of the optical switches, the optically-switched communication network which including the optical NICs and the optical switches.

23 Claims, 11 Drawing Sheets

(52) U.S. Cl.
CPC ......... *H04Q 11/0421* (2013.01); *H04Q 11/00* (2013.01); *H04Q 11/0062* (2013.01); *H04Q 2011/0018* (2013.01); *H04Q 2011/0022* (2013.01); *H04Q 2011/0041* (2013.01); *H04Q 2011/0064* (2013.01)

(58) Field of Classification Search
CPC ... H04Q 2011/0018; H04Q 2011/0041; H04Q 2011/0022; H04Q 2011/0064; H04Q 11/0062; H04Q 11/00; H04L 41/08
USPC .................................................. 398/43–103
See application file for complete search history.

(56) References Cited

U.S. PATENT DOCUMENTS

| | | | | |
|---|---|---|---|---|
| 6,101,013 | A * | 8/2000 | Monacos | H04L 45/00 398/1 |
| 7,167,480 | B1 * | 1/2007 | Somashekhar | H04Q 11/0005 370/413 |
| 7,860,392 | B2 | 12/2010 | Hoang et al. | |
| 8,774,232 | B2 | 7/2014 | Smith et al. | |
| 9,430,437 | B1 * | 8/2016 | Krishnan | G06F 13/4027 |
| 9,602,434 | B1 * | 3/2017 | Saleh | H04J 14/08 |
| 9,925,492 | B2 * | 3/2018 | Raikin | G06F 13/287 |
| 10,200,144 | B1 * | 2/2019 | Chowdhury | H04J 14/021 |
| 2002/0124104 | A1 * | 9/2002 | Rappaport | H04L 47/34 709/238 |
| 2002/0141400 | A1 * | 10/2002 | DeMartino | H04L 12/52 370/386 |
| 2003/0187914 | A1 * | 10/2003 | Kaniyar | H04L 67/1002 709/201 |
| 2004/0120261 | A1 * | 6/2004 | Ovadia | H04Q 11/0062 370/252 |
| 2008/0008189 | A1 | 1/2008 | Verma et al. | |
| 2012/0106955 | A1 * | 5/2012 | Le Rouzic | H04L 12/2801 398/45 |
| 2013/0103777 | A1 * | 4/2013 | Kagan | H04L 49/901 709/212 |
| 2014/0019663 | A1 * | 1/2014 | Ishii | G06F 13/28 710/308 |
| 2014/0314417 | A1 * | 10/2014 | Leigh | H04L 41/12 398/154 |
| 2015/0098466 | A1 * | 4/2015 | Haramaty | H04L 45/16 370/392 |
| 2015/0104171 | A1 * | 4/2015 | Hu | H04Q 11/0066 398/48 |
| 2015/0189409 | A1 | 7/2015 | He | |
| 2016/0134375 | A1 * | 5/2016 | Kakande | H04J 14/02 398/135 |
| 2016/0294715 | A1 * | 10/2016 | Raindel | H04L 45/38 |
| 2016/0359758 | A1 * | 12/2016 | Shpiner | H04L 47/32 |
| 2017/0093699 | A1 * | 3/2017 | Crupnicoff | H04L 47/263 |
| 2018/0070157 | A1 * | 3/2018 | Menard | H04Q 11/0005 |
| 2018/0234473 | A1 * | 8/2018 | Levi | H04L 49/90 |
| 2020/0177525 | A1 * | 6/2020 | Morris | H04L 49/552 |

OTHER PUBLICATIONS

Farrington et al., "Helios: A hybrid electrical/optical switch architecture for modular data centers", Proceedings of the ACM SIGCOMM 2010 Conference, New York, pp. 339-350, year 2010.

Benzaoui et al., "Cboss: bringing traffic engineering inside data center networks", IEEE/OSA Journal of Optical Communications and Networking, vol. 10, No. 7, pp. 117-125, Jul. 2018.

Wang et al., "c-through: part-time optics in data centers", SIGCOMM Computer Communication Review, vol. 41, No. 4, pp. 327-338, Aug. 2010.

Mellette et al., "Rotornet: A scalable, low-complexity, optical datacenter network", Proceedings of the Conference of the ACM Special Interest Groupon Data Communication, New York, USA, pp. 267-280, year 2017.

Valadarsky et al., "Xpander: Unveiling the secrets of high-performance datacenters", Proceedings of the 14th ACM Workshop on Hot Topics in Networks, pp. 1-7, year 2015.

International Application # PCT/GR2019/000077 search report dated May 25, 2020.

Liu et al., "Scheduling Techniques for Hybrid Circuit/Packet Networks", Proceedings of the 11th ACM Conference on Emerging Networking Experiments and Technologies, New York, USA, pp. 1-13, year 2015.

Liu et al., "Better Algorithms for Hybrid Circuit and Packet Switching in Data Centers", arXiv:1712.06634v, pp. 1-26 Dec. 20, 2017.

* cited by examiner

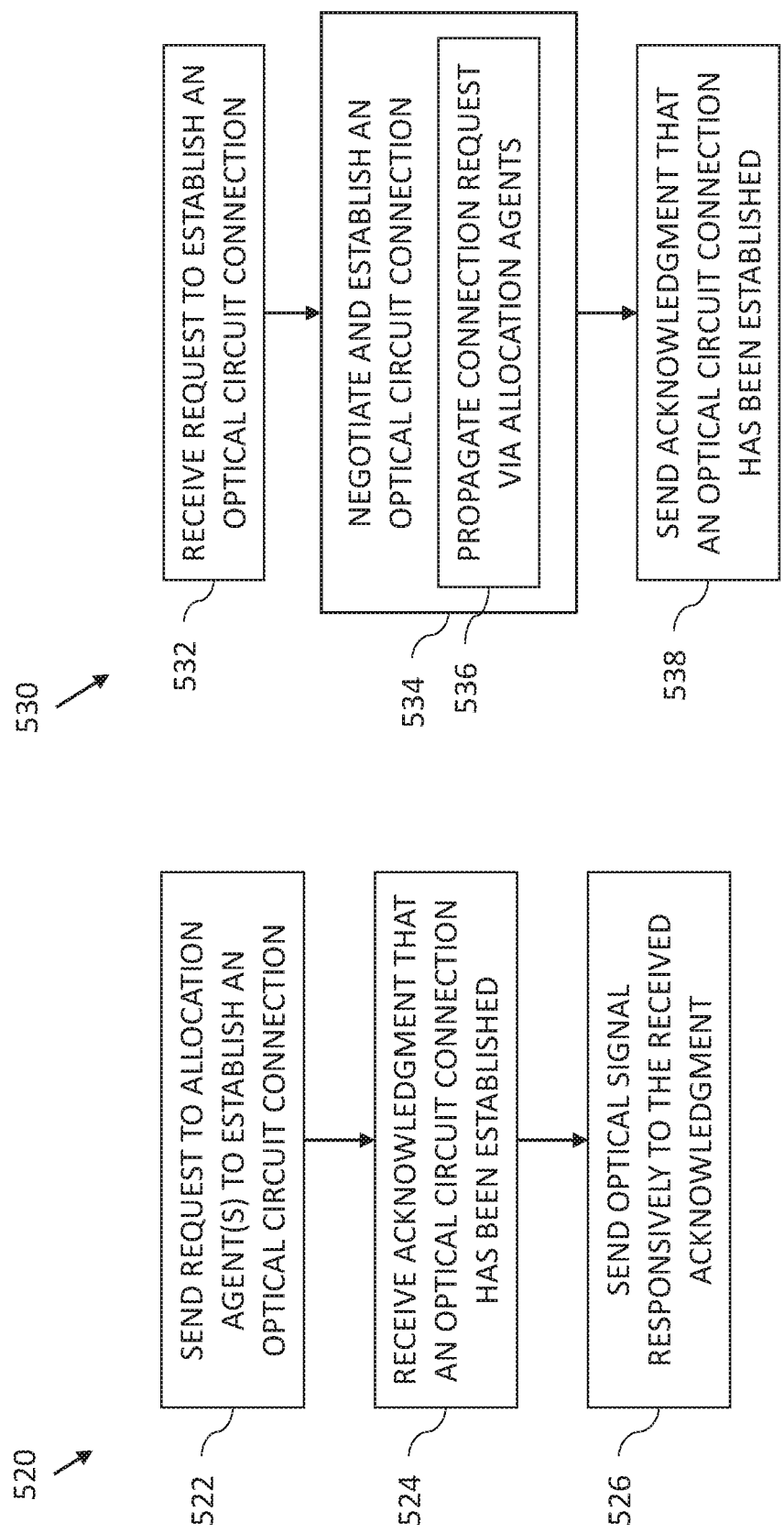

OPTICAL NETWORK SYSTEM

RELATED APPLICATION INFORMATION

The present application claims priority from Greek Patent Application S/N 20190100546 filed 5 Dec. 2019, the disclosure of which is hereby incorporated herein by reference.

FIELD OF THE INVENTION

The present invention relates to optical systems, and in particular, but not exclusively to, optical devices and networks.

BACKGROUND

Datacenters are the storage and data processing hubs of the internet. The massive deployment of cloud applications is causing datacenters to expand exponentially in size, stimulating the development of faster switches in order to cope with the increasing data traffic inside the datacenter. Current state-of-the-art switches are capable of handling 12.8 Tb/s of traffic by employing application specific integrated circuits (ASICs) equipped with 256 data lanes, each operating at 50 Gb/s (gigabits per second). Such switch ASICs typically consume as much as 400 watts (W), whereas the power consumption of the optical transceiver interfaces attached to the ASIC is comparable.

To keep pace with traffic demand, switch capacity has to be doubled every approximately two years. So far, this rapid scaling was possible by exploiting advances in CMOS (Complementary Metal Oxide Semiconductor) manufacturing, collectively described by Moore's law (i.e. the observation that the number of transistors in a dense integrated circuit doubles about every two years). However, in recent years there are strong indications of Moore's law slowing down, which raises concerns as per the capability to sustain the target scaling rate of switch capacity. Alternative technological approaches have been identified, such as the co-integration of photonics and electronics in multi-chip modules, which are expected to enable the development of datacenter switches with up to 100 Tb/s (terabits per second) capacity. However, it is expected that further scaling will not be possible in a way that is viable from the technological, economic and power consumption perspective. As a result, alternative technologies are being investigated.

Optical switching is gaining traction as a candidate enabling technology, owing to the technology's potential for very high data capacity and low power consumption. Optical switching introduces the notion of devices called optical switches, which feature optical input and output ports and are capable of routing the light that is coupled to their input ports to the intended output ports according to a fixed schedule, or on demand, according to one or more control signals (electrical or optical). Routing of the signals is performed in the optical domain, i.e., without the need for optical-electrical and electrical-optical conversion, thus bypassing the need for power-consuming transceivers.

SUMMARY

There is provided in accordance with an embodiment of the present disclosure, an optical network system, including a plurality of optical switches configured to switch beams of light which are modulated to carry information, a plurality of host computers including respective optical network interface controllers (NICs), and optical fibers connecting the optical NICs and the optical switches forming an optically-switched communication network, over which optical circuit connections are established between pairs of the optical NICs over ones of the optical fibers via ones of the optical switches, the optically-switched communication network including the optical NICs and the optical switches.

Further in accordance with an embodiment of the present disclosure, the system includes at least one network controller configured to manage establishment of the optical circuit connections.

Still further in accordance with an embodiment of the present disclosure the optical switches include ports, each of the NICs being connected by a respective one of the optical fibers to a respective one of the ports without even one intervening electrical switch.

Additionally, in accordance with an embodiment of the present disclosure each of the optical NICs includes at least one network interface port including at least one optical transmitter and at least one optical receiver configured to be connected to the optically-switched communication network, a controller agent configured to negotiate, with a network controller, establishment of the optical circuit connections from a respective one of the NIC devices over the optically-switched communication network, and receive data about establishment of the optical circuit connections from the network controller, and a device controller configured to manage queueing of packets awaiting transmission over the optically-switched communication network, and manage sending the packets in optical signals from the at least one optical transmitter over the optically-switched communication network responsively to the data about the establishment of the optical circuit connections.

Moreover, in accordance with an embodiment of the present disclosure the optical switches include a plurality of rotor switches, each rotor switch including ports, and being configured to implement a respective set of permutations of connections between the ports, and a plurality of inter-group optical top of rack (ToR) switches connected to the rotor switches, each inter-group optical ToR switch also being connected to the optical NICs of a respective group of the host computers via respective ones of the optical fibers.

Further in accordance with an embodiment of the present disclosure, the system includes at least one network controller configured to compute a schedule of time slots of ones of the optical circuit connections responsively to switching schedules of ones of the rotor switches and data of queued packets in ones of the optical NICs, and provide respective scheduling information to respective ones of the optical NICs responsively to the schedule.

Still further in accordance with an embodiment of the present disclosure the optical NICs include respective optical transmitters and optical receivers, each inter-group optical ToR switch is connected to the optical transmitters of the optical NICs of the respective group of the host computers via the respective ones of the optical fibers, each rotor switch is connected to the optical receivers of respective ones of the optical NICs, the optical switches include a plurality of intra-group optical ToR switches different from the plurality of inter-group optical ToR switches, and each intra-group optical ToR switch connects the optical NICs of a respective group of the host computers via respective ones of the optical fibers.

Additionally, in accordance with an embodiment of the present disclosure the inter-group optical ToR switches are connected to the rotor switches in a Clos topology.

Moreover, in accordance with an embodiment of the present disclosure, the system includes inter-group network controllers associated with respective groups of the host computers and respective ones of the inter-group optical ToR switches, each inter-group network controller being configured to compute a respective inter-group schedule of time slots of the optical circuit connections from ones of the optical NICs of a respective one of the groups of the host computers via a respective one of the inter-group optical ToR switches responsively to rotor switch switching schedules and data of queued packets in the ones of the optical NICs of the respective group of the host computers, provide the respective inter-group schedule to the respective inter-group optical ToR switch, provide respective inter-group scheduling information to ones of the optical NICs of the respective group of the host computers responsively to the respective inter-group schedule.

Further in accordance with an embodiment of the present disclosure, the system includes intra-group network controllers associated with the respective groups of the host computers and respective ones of the intra-group optical ToR switches, each intra-group network controller being configured to compute a respective intra-group schedule of time slots of the optical circuit connections among the optical NICs of a respective one of the groups of the host computers via a respective one of the intra-group optical ToR switches responsively to data of queued packets in the ones of the optical NICs of the respective group of the host computers, provide the respective intra-group schedule to the respective intra-group optical ToR switch, and provide respective intra-group scheduling information to ones of the optical NICs of the respective group of the host computers responsively to the respective intra-group schedule.

Still further in accordance with an embodiment of the present disclosure each optical NIC includes a device controller configured to manage queuing of packets awaiting transmission over the optically-switched communication network, and manage sending the packets in optical signals over the optically-switched network responsively to data about establishment of the optical circuit connections.

Additionally, in accordance with an embodiment of the present disclosure each of the optical NICs includes two optical transmitters and two optical receivers to respectively transmit and receive optical signals with two different wavelengths, one of the wavelengths being used for direct connections and one of the wavelengths for indirect connections in a load balancing scheme.

Moreover, in accordance with an embodiment of the present disclosure, the system includes a plurality of optical wavelength routers associated with respective ones of the optical NICs, each optical wavelength router including an input connected to a respective one of the optical fibers and two outputs respectively connected to the two optical receivers of a respective one of the optical NICs, and being configured to separate the optical signals with the two different wavelengths received from the respective optical fiber for separate transmission into to the respective ones of the optical receivers of the respective optical NIC responsively to the different wavelengths of the optical signals.

Further in accordance with an embodiment of the present disclosure, the system includes a plurality of allocation agents associated with respective ones of the optical switches, wherein a first one of the optical NICs is configured to send a request to at least one of the allocation agents to establish an optical circuit connection to a second one of the optical NICs, respective ones of the allocation agents are configured negotiate and establish an optical circuit connection from the first optical NIC to the second optical NIC via respective ones of the optical switches, the first optical NIC is configured to receive an acknowledgment from one of the allocation agents responsively to the established optical circuit connection, and the first optical NIC is configured to send an optical signal responsively to the received acknowledgment.

Still further in accordance with an embodiment of the present disclosure the allocation agents are connected via a packet-switched network, which has a same topology as the optically-switched communication network.

Additionally, in accordance with an embodiment of the present disclosure the optical NICs are configured to share a common time reference among the host computers in the optically-switched communication network.

Moreover, in accordance with an embodiment of the present disclosure, the system includes a plurality of electrical top of rack (ToR) switches, wherein the optical switches include a plurality of rotor switches, each rotor switch including ports, and being configured to implement a respective set of permutations of connections between the ports, the optical NICs include respective optical transmitters and optical receivers, each rotor switch is connected to the optical transmitters of respective ones of the optical NICs, and to optical receivers of respective ones of the optical NICs, each electrical ToR switch connects the optical NICs of respective groups of the host computers via a respective packet-switched network.

Further in accordance with an embodiment of the present disclosure each optical NIC includes a device controller configured to manage queuing of packets awaiting transmission over the optically-switched communication network, and manage sending the packets in optical signals over the optically-switched network responsively to data about establishment of the optical circuit connections.

There is also provided in accordance with another embodiment of the present disclosure, a network interface controller (NIC) device, including at least one network interface port including at least one optical transmitter and at least one optical receiver configured to be connected to an optically-switched communication network, over which optical circuit connections from the NIC device are established, optically-switched communication network including optical switches and other optical NICs, and a device controller configured to manage queueing of packets awaiting transmission over the optically-switched communication network, and manage sending the packets in optical signals from the at least one optical transmitter over the optically-switched communication network responsively to data about establishment of the optical circuit connections.

Still further in accordance with an embodiment of the present disclosure the data about the establishment of the optical circuit connections includes data of timeslots in which respective ones of the optical circuit connections will be established, and the device controller is configured to schedule sending the packets addressed to a plurality of destinations from the at least one optical transmitter in the optical signals over the optically-switched communication network responsively to the data of timeslots in which respective ones of the optical circuit connections associated with respective ones of the destinations will be established.

Additionally in accordance with an embodiment of the present disclosure, the device includes a controller agent configured to negotiate, with at least one network controller, the establishment of the optical circuit connections from the NIC device over the optically-switched communication network, and receive the data about the establishment of the optical circuit connections from the at least one network controller.

Moreover in accordance with an embodiment of the present disclosure, the device includes a context memory configured to store pointers to memory locations of respective ones of the packets awaiting transmission, and wherein the controller agent is configured to negotiate, with the at least one network controller, the establishment of the optical circuit connections responsively to at least part of a content of the context memory, the content including at least one packet destination identification.

Further in accordance with an embodiment of the present disclosure, the device includes time synchronization circuitry configured to maintain a clock value which is synchronized with at least one other clock value in the optically-switched communication network, and a packet buffer configured to buffer the packets assigned for sending over the optically-switched communication network, and time a release of the buffered packets for sending over the optically-switched communication network responsively to respective timestamps assigned to respective ones of the buffered packets by the device controller and the maintained clock value.

Still further in accordance with an embodiment of the present disclosure, the device includes a controller agent configured to negotiate, with at least one network controller, the establishment of the optical circuit connections from the NIC device over the optically-switched communication network, and receive the data about the establishment of the optical circuit connections from the at least one network controller, and wherein the data about the establishment of the optical circuit connections includes acknowledgments that respective ones of the optical circuit connections have been established, and the device controller is configured to manage sending the packets addressed to a plurality of destinations from the at least one optical transmitter in the optical signals over the optically-switched communication network responsively to the receiving respective ones of the acknowledgments that respective ones of the optical circuit connections associated with respective ones of the destinations have been established.

Additionally in accordance with an embodiment of the present disclosure, the device includes a context memory configured to store pointers to memory locations of respective ones of the packets awaiting transmission, and wherein the controller agent is configured to negotiate, with the at least one network controller, the establishment of the optical circuit connections responsively to at least part of a content of the context memory, the content including at least one packet destination identification.

Moreover, in accordance with an embodiment of the present disclosure, the device includes burst clock data recovery (CDR) circuitry connected to the at least one optical receiver, and configured to extract a clock value from an incoming serial bitstream.

BRIEF DESCRIPTION OF THE DRAWINGS

The present invention will be understood from the following detailed description, taken in conjunction with the drawings in which:

FIG. 11 is a flowchart including steps in a method of operation of a NIC device in the system of FIG. 10;

FIG. 12 is a flowchart including steps in a method of operation of allocation agent(s) in the system of FIG. 10.

DESCRIPTION OF EXAMPLE EMBODIMENTS

Overview

Figure 1:
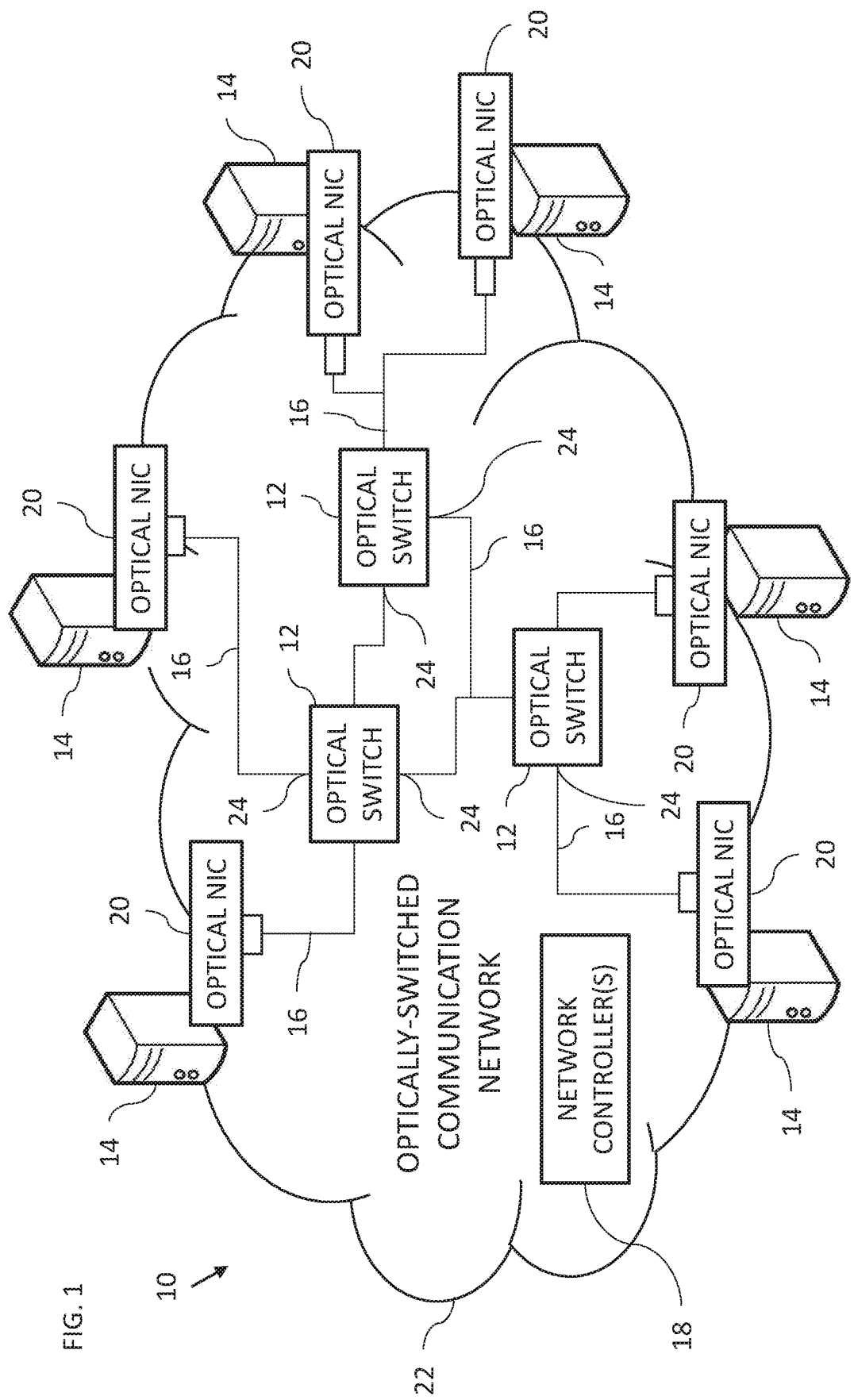
FIG. 1 is a block diagram view of an optical network system constructed and operative in accordance with an embodiment of the present invention.

Introduction of optical switching in the data center has proven to be a nontrivial task due to the idiosyncrasy of optical switches that differ from their electrical counterparts. It is generally not possible to retrofit optical switches into the existing network infrastructure, primarily because of (a) the lack of buffering/processing capabilities in the optical switches, and (b) the unavailability of optical switches providing simultaneously high port radix and fast reconfiguration times.

By way of example, optical switches are circuit switches whereas electrical switches are packet switches. Electrical switches process packet-by-packet and have buffers so that whenever there is available bandwidth on the respective output port the packet is sent. Optical switches cannot buffer the optical signals and generally forward incoming optical signals according to a pre-negotiated or a predefined input-output mapping schedule. For example, whatever optical signals enter the optical switch at time t from port 1 will be forwarded to port 3.

To cope with these limitations, relevant work so far relies on an aggregation layer based on electrical switches, typically called Top-of-Rack (ToR) switches as they serve a number of end hosts, e.g., servers fitting in a rack enclosure. The electrical ToR switches provide an aggregation layer that collects data from multiple end hosts (e.g., servers, storage enclosures) and aggregates them towards the higher network tier, which is implemented with optical switches. Hence despite the small radix of the optical switching plane, an adequate number of hosts can be supported in the network. Although this approach partially addresses the port limitation of optical switches it raises a number of nontrivial concerns, for example, the scalability of the electrical switches is limited and is expected to pose a bottleneck in the forthcoming years.

Embodiments of the present invention that are described herein address the above concerns by removing the electrical ToR switch from the edges of the optical network. In the present embodiments, the hosts via respective optically-enabled network interface controllers (NICs) (also described herein as optical NICs) are connected directly to an optically-switched communication network with optical circuit connections being established between the optical NICs. The optical NICs are synchronized with the optically-switched communication network and packets are sent by the NICs in the correct time slots so that the packets are sent across the optical network via respective optical switches and successfully arrive at their correct destinations.

In some embodiments, the optical NICs manage queuing and buffering of packets to be sent over the optically-switched communication network until respective optical circuit connections are ready for sending the packets to their respective destinations via the respective optical circuit connections. Each optical NIC negotiates establishment of optical circuit connections with one or more network controllers. In disclosed embodiments, each optical NIC receives scheduling data including details of the timeslots in which respective optical circuit connections will be established. In some embodiments, each optical NIC receives an acknowledgment that a requested optical circuit connection has been established and is ready for use by the requesting optical NIC.

By contrast, it should be noted that an electrical NIC may send packets in optical signals over optical fibers, for example, to an electrical ToR switch. However, an electrical NIC cannot send packets in an optical signal over an optically-switched communication network as the electrical NIC does not schedule sending packets according to negotiated optical circuit connections but simply sends packets received from the host as the packets are processed by the electrical NIC.

Embodiments of the present invention offer a number of advantages including: (a) taking full advantage of the bandwidth capacity offered by the optical network and keeping up with the increasing bandwidth per port on the hosts by removing the electrical ToR switches from the edge of the optical network; (b) reducing networking power consumption by removing high-radix and bandwidth electrical switches (with attached optical transceivers) which consume a high percentage of the total networking power consumption; (c) removing latency introduced by electrical switches; (d) reducing capital and overhead cost of equipment; and (e) improving network upgradeability as optical switches are transparent to the bitrate of the traversing optical signals.

Embodiments of the present invention provide an optically-switched communication network whose data plane consists of optically-enabled end-hosts and optical switches. The end hosts can be servers, storage enclosures, processing nodes, etc., that interface to the network by means of optical NICs equipped with at least one optical physical medium interface. In the remainder of this document, the term NIC or optical NIC is used interchangeably with the term end-host to represent the network element that resides at the host side of the network. The optical NICs are attached to an optical switching plane, which consists of multiple optical switches that may be interconnected with each other so as to provide connectivity between the optical NICs. Embodiments of the present invention are useful particularly, though not exclusively, in datacenter networks (e.g., cloud datacenter or High-Performance Computing (HPC)), where (in contrast to long-reach telecom networks) the traffic demand varies dynamically in time, whereas fiber spectrum utilization comes at lower priority.

System Description

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Reference is now made to FIG. 1, which is a block diagram view of an optical network system 10 constructed and operative in accordance with an embodiment of the present invention. The optical network system 10 includes a plurality of optical switches 12, a plurality of host computers 14, optical fibers 16 (only some labeled for the sake of simplicity), and optionally at least one network controller 18. Although, only three optical switches 12 have been shown in FIG. 1 for the sake of simplicity, any suitable number of optical switches 12 arranged in any suitable topology may be used in the optical network system 10. Examples, of optical networks implemented according to different topologies are described later on in this disclosure. The optical switches 12 are configured to switch beams of light which are modulated to carry information. The optical switches 12 may comprise any suitable type or types of optical switches, for example, optical rotor switches or optical ToR switches described in more detail below. The host computers 14 comprise respective optical network interface controllers (NICs) 20. Each host computer 14 typically includes one or more of the optical NICs 20. The optical fibers 16 connect the optical NICs 20 and the optical switches 12 forming an optically-switched communication network 22, over which optical circuit connections are established between pairs of the optical NICs 20 over ones of the optical fibers 16 via one or more of the optical switches 12. The optically-switched communication network 22 includes the optical NICs 20 and the optical switches 12. Each optical NIC 20 may be directly connected to one or more of the optical switches 12 in any suitable configuration. The network controller(s) 18 is (are) configured to manage establishment of the optical circuit connections between the pairs of the optical NICs 20 over ones of the optical fibers 16 via one or more of the optical switches 12. For example, an optical circuit connection may be established between a pair of the optical NICs 20 via one or more optical switches 12. The optical switches 12 include ports 24 (only some labeled for the sake of simplicity). Each NIC 20 is connected by a respective one of the optical fibers 16 to a respective one of the ports 24 without even one intervening electrical switch between that NIC 20 and the respective port 24.

The optical circuit connections are generally created by one or more of the optical switches 12 switching according to a fixed schedule (for example, in the case of optical rotor switches) and/or according to a schedule of timeslots negotiated by the network controller(s) 18 (for example, in the case of optical ToR switches).

Figure 2:
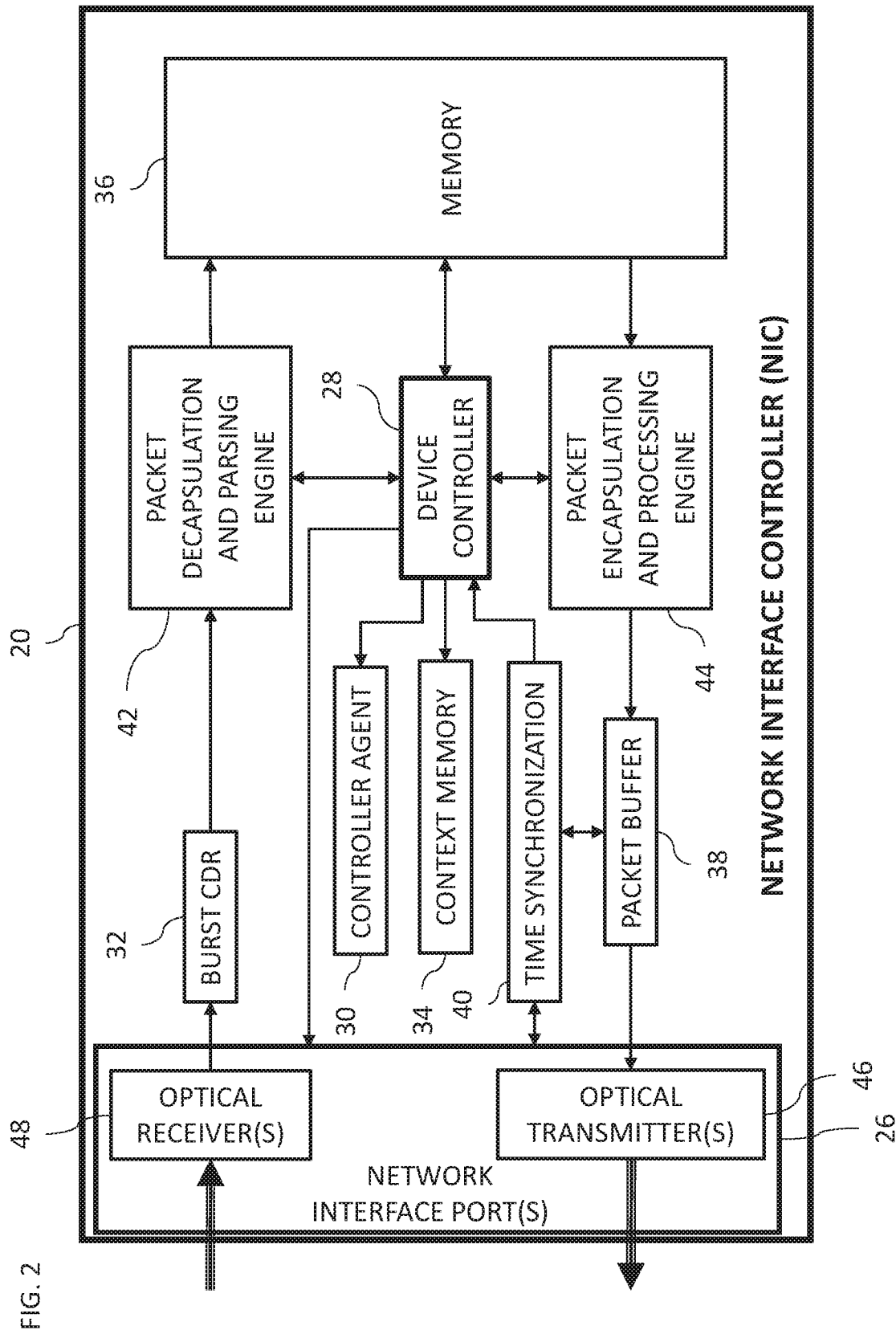
FIG. 2 is a block diagram view of a network interface controller (NIC) constructed and operative in accordance with an embodiment of the present invention.

Reference is now made to FIG. 2, which is a block diagram view of one of the NICs 20 constructed and operative in accordance with an embodiment of the present invention. The optical NIC 20 includes at least one network interface port 26, a device controller 28, a controller agent 30, burst CDR circuitry 32, a context memory 34, a memory 36, a packet buffer 38, time synchronization circuitry 40, a packet decapsulation and parsing engine 42, and a packet encapsulation and processing engine 44. The optical NIC 20 may include other features which are not shown, for example, but not limited to, an interface with its host computer 14 (FIG. 1) to receive packets from the host computer 14 and send packets to the host computer 14.

The network interface port(s) 26 include at least one optical transmitter 46 and at least one optical receiver 48 configured to be connected to the optically-switched communication network 22 (FIG. 1), which includes the optical switches 12 (FIG. 1) and other optical NICs 20 (FIG. 1). The optical transmitter(s) 46 and the optical receiver(s) 48 perform modulation and demodulation of optical signals so as to encode packet data in optical signals and decode packet data from optical signals, respectively.

The device controller 28 is configured to manage various operations in the optical NIC 20 include sending and receiving packets via the network interface port 26. The device controller 28 may perform other functions, such as scheduling, provision for quality of service (QoS), and monitoring, etc. The device controller 28 is described in more detail with reference to FIG. 4 below. In practice, some or all of the functions of the device controller 28 may be combined in a single physical component or, alternatively, implemented using multiple physical components. These physical components may comprise hard-wired or programmable devices, or a combination of the two. In some embodiments, at least some of the functions of the device controller 28 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The controller agent 30 is configured to negotiate optical circuit connections for the optical NIC 20 based on information provided, typically by the device controller 28, from the context memory 34 described in more detail below and with reference to FIG. 3. The controller agent 30 provides information to the NIC 20 regarding the network transmission schedule (in the case of slotted optical networks, either using a fixed or a dynamically-reconfigurable schedule) or the available optical paths for given source-destination pairs. The controller agent 30 may also provide information from the NIC 20 to the network controller(s) 18 regarding the load of the NIC 20 (i.e., buffer status) and capabilities of the NIC 20 such as wavelengths at which the NIC 20 is able to transmit, and priorities per destination instead of, or in additional to, buffer size.

In practice, some or all of the functions of the controller agent 30 may be combined in a single physical component or, alternatively, implemented using multiple physical components. These physical components may comprise hard-wired or programmable devices, or a combination of the two. In some embodiments, at least some of the functions of the controller agent 30 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The context memory 34 is configured to store pointers to memory locations of respective packets awaiting transmission. The memory locations may be in the memory 36, or in a memory of the host computer 14, or in any suitable location. The context memory 34 may also include data about the remote host destinations of the stored packets and other information, for example, source address, type of data, priorities.

The time synchronization circuitry 40 is configured to maintain a clock value (common to the optical NICs 20 and the optical switches 12 in the optically-switched communication network 22), which is synchronized with at least one other clock value in the optically-switched communication network 22. The term "clock value", as used in the specification and claims, is defined to include a frequency and/or a phase value. Time synchronization may be performed using any suitable method, for example using dedicated hardware such as dedicated time reference ports on the optical NIC 20, or by implementing suitable timing protocols such as Precision Time Protocol (PTP). The clock value may be used to control the time that data is released from the packet buffer 38 to the network interface port 26 for transmission over the optically-switched communication network 22 and/or the time that the optically-switched communication network 22 is reconfigured as described in more detail below.

The packet buffer 38 is configured to buffer the packets assigned for sending over the optically-switched communication network 22 and time a release of the buffered packets for sending over the optically-switched communication network 22 responsively to respective timestamps assigned to respective ones of the buffered packets by the device controller 28 and the maintained clock value, which is maintained by the time synchronization circuitry 40. The packet buffer 38 may be implemented in hardware and/or software.

The burst CDR circuitry 32 is connected to the optical receiver(s) 48, and is configured to extract a clock value (recovered clock) from an incoming serial bitstream. The recovered clock is used to sample the received bits (for example, to correctly distinguish 0s from 1s). In the optical network system 10 (as opposed to electrical networks), as links are not point to point, the clock data recovery is performed for each optical frame that is received by the NIC 20. The clock recovery process is performed as quickly as possible in a small fraction of the slot duration as during the clock data recovery process transmission of other data is not performed (and in many cases cannot be performed) and thus the duration of the clock recovery process affects the network/links utilization. Therefore, the optical NICs 20 are configured to share a common time reference among the host computers 14 in the optically-switched communication network 22.

The packet decapsulation and parsing engine 42 and the packet encapsulation and processing engine 44 are configured to perform decapsulation and encapsulation of received and outgoing packets, respectively, according to any suitable protocol (e.g., Ethernet, InfiniBand, or any other protocol appropriate for the specific network and/or optical switching) through the optically-switched communication network 22. The encapsulation process may include, for example, the addition of header bits facilitating burst-mode clock recovery or the introduction of dead time intervals to allow for the optical switches 12 (FIG. 1) to reconfigure their state. The packet decapsulation and parsing engine 42 and the packet encapsulation and processing engine 44 may be implemented in hardware and/or software.

Interconnecting the NIC 20 to the optically-switched communication network 22 poses a number of constraints on the NIC 20. In contrast to conventional electrical NICs, which indicate only the final destination of the packet, the NIC 20 may maintain information regarding the entire network configuration or a portion thereof, indicating when and/or how an optical circuit connection from the source to the destination is provided. Depending on the specific network architecture and type of optical switches, the maintained information may include any suitable combination of selected from: time-slot; port; or wavelength, etc., that the NIC 20 will apply in transmitting each flow of packets.

It should be noted that not all of the above functions (and those described below with reference to FIGS. 3 and 4) may be necessary for connecting the optical NIC 20 to the optically-switched communication network 22, depending on the exact network topology and switch implementation of the optically-switched communication network 22.

Figure 3:
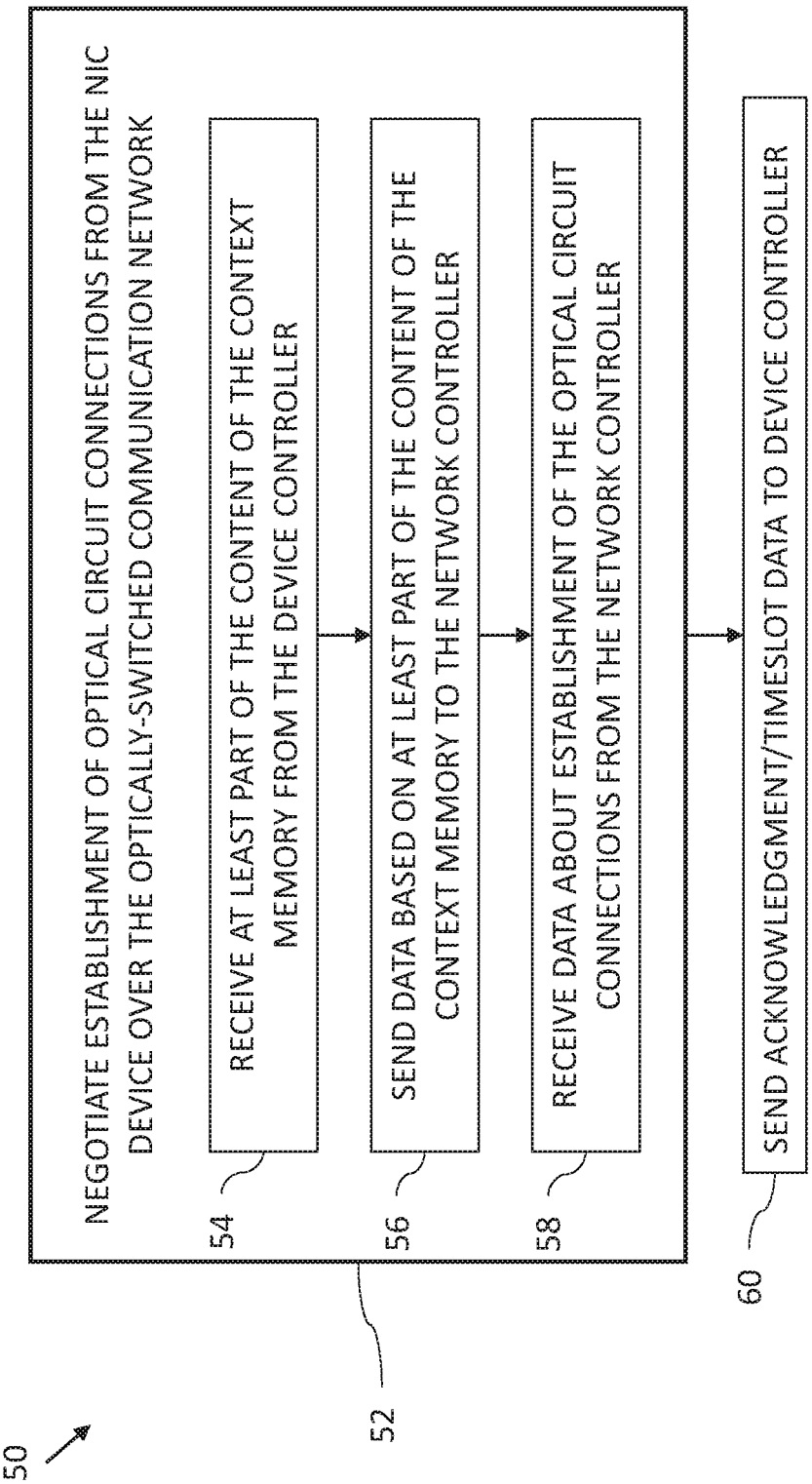
FIG. 3 is a flowchart including steps in a method of operation of a controller agent of the NIC of FIG. 2.

Reference is now made to FIG. 3, which is a flowchart 50 including steps in a method of operation of a controller agent 30 of the NIC 20 of FIG. 2. Reference is also made to FIG. 2. The controller agent 30 may communicate with the network controller(s) 18 via any suitable network, for example, via an electrical network or via the optically-switched communication network 22 (FIG. 1).

The controller agent 30 is configured to negotiate (block 52), with the network controller(s) 18, establishment of optical circuit connections from the NIC device 20 over the optically-switched communication network 22. In some embodiments, the controller agent 30 is configured to negotiate, with the network controller(s) 18, establishment of the optical circuit connections responsively to at least part of a content of the context memory 34. The content includes: one or more packet destination identifications of packets stored in the memory 36 and awaiting transmission; and optionally a size of the packets stored for each destination.

The step of block 52 includes sub-steps described with reference to blocks 54-58 below. The controller agent 30 is configured to receive (block 54) at least part of the content of the context memory 34 from the device controller 28. In some embodiments, the controller agent 30 is configured to receive data based on the content of the context memory 34 from the device controller 28. The controller agent 30 is configured to send (block 56) data based on the content (or part thereof) of the context memory 34 to the network controller(s) 18.

In some embodiments, the network controller(s) 18 is configured to run a scheduling algorithm yielding a schedule including a list of destinations and respective time slots. In other embodiments, the network controllers 18 are configured to allocate an optical circuit connection across the optically-switched communication network 22, as described in more detail with reference to FIG. 10.

The controller agent 30 is configured to receive (block 58) data about establishment of the optical circuit connections from the network controller(s) 18. In some embodiments, the data about establishment of the optical circuit connections comprises data of timeslots in which respective ones of the optical circuit connections will be established. In other embodiments, the data about establishment of the optical circuit connections comprises acknowledgments that respective ones of the optical circuit connections have been established. The data of different timeslots may be received at different times. Similarly, different acknowledgments may be received at different times.

The methods used to establish the optical circuit connections and the nature of the data about establishment of the optical circuit connections may depend on how the source-destination communication takes place through the specific optical switching data plane. Such methods are cognitive of the architecture and operation of the optically-switched communication network 22 and designate when and how the NIC 20 communicates with the optical data plane. For example, in slotted optical networks, using time domain multiple access (TDMA), the method may designate the time slot when the NIC 20 establishes a specific source-destination communication. In optical networks that provide multiple redundant paths for the same source-destination pair (e.g., expander-type networks), the method may designate which path is selected for a specific source-destination communication. In optical networks in which multiple wavelengths are used, the method may designate which wavelength is selected for a specific source-destination communication.

The controller agent 30 is configured to send (block 60) the acknowledgment/timeslot data to the device controller 28.

Figure 4:
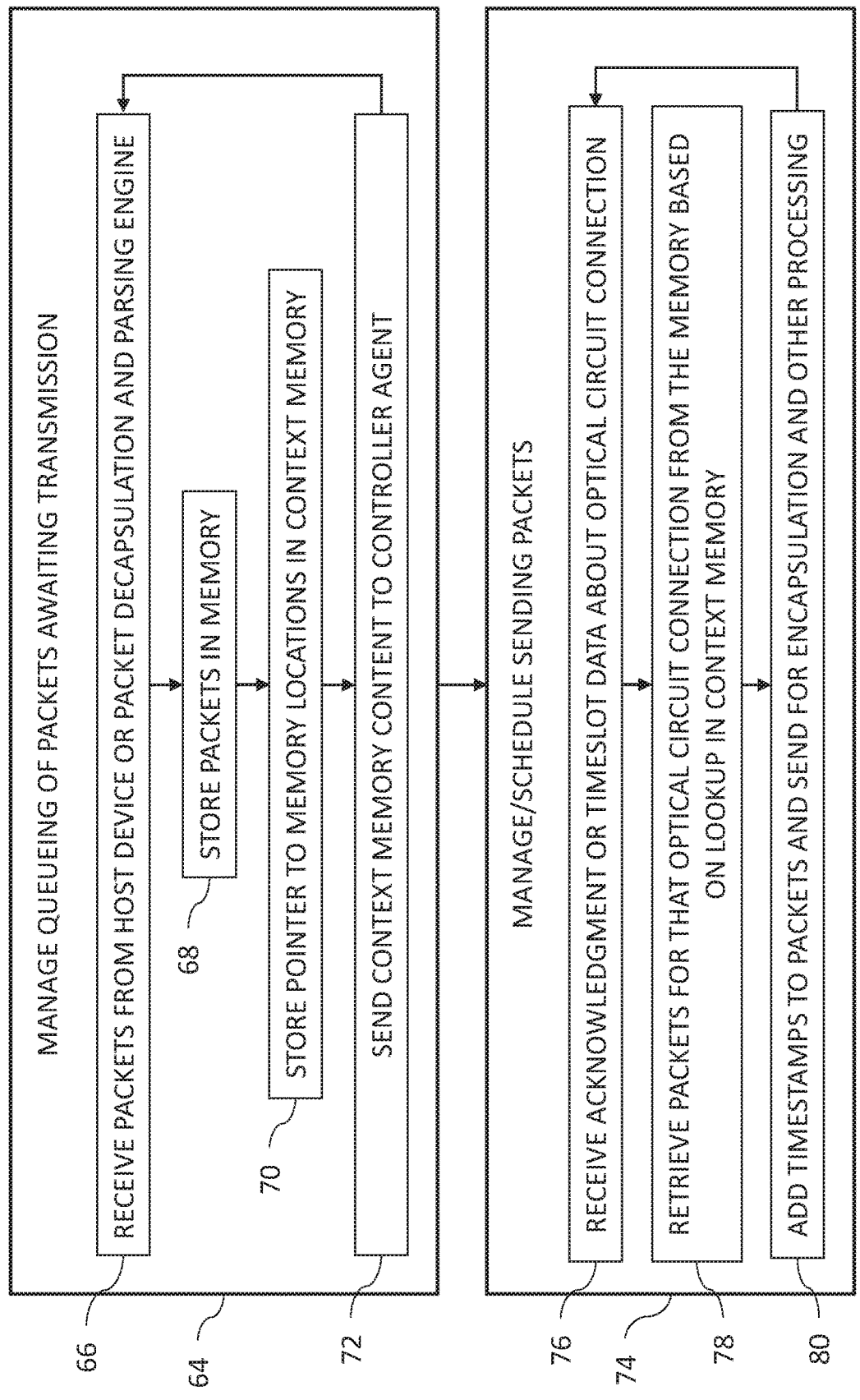
FIG. 4 is a flowchart including steps in a method of operation of a device controller of the NIC of FIG. 2.

Reference is now made to FIG. 4, which is a flowchart 62 including steps in a method of operation of a device controller 28 of the NIC 20 of FIG. 2. Reference is also made to FIG. 2.

The device controller 28 is configured to manage (block 64) queueing of packets awaiting transmission over the optically-switched communication network 22 (FIG. 1). Sub-steps of the step of block 64 are now described with reference to blocks 66-72.

The device controller 28 is configured to receive (block 66) packets from the host computer 14 and/or from the packet decapsulation and parsing engine 42 (e.g., packets received by NIC controller from another host 14 but destined for another final destination). The device controller 28 is configured to store (block 68) the packets in the memory 36 or any suitable memory, described in more detail below. The device controller 28 is configured to store (block 70), in the context memory 34, pointers to the memory locations of the stored packets. The device controller 28 is configured to send (block 72) the content (or part thereof) of the context memory 34 to the controller agent 30.

The device controller 28 is configured to manage multiple output queues (e.g., virtual output queues—VOQs), typically one output queue for each destination NIC 20. The NIC 20 transmits data from the appropriate queue according to the configuration of the optical network. VOQs may be created in the memory 36 or in dedicated hardware queues, or any suitable combination thereof. For example, several packets may be stored in a small-sized hardware memory with the other packets being stored in DRAM. Alternatively, the packets may be stored in the memory of the host computer 14 (e.g., the server's memory) and retrieved when the packets are scheduled to be transmitted.

The device controller 28 is configured to manage (block 74) sending the packets in optical signals from the optical transmitter(s) 46 over the optically-switched communication network 22 responsively to the data about the establishment of the optical circuit connections.

In some embodiments, the device controller 28 is configured to manage sending the packets addressed to a plurality of destinations from the optical transmitter(s) 46 in the optical signals over the optically-switched communication network 22 responsively to receiving respective acknowledgments that respective optical circuit connections associated with respective destinations have been established.

In some embodiments, the device controller 28 is configured to schedule sending the packets (addressed to a plurality of destinations) from the optical transmitter(s) 46 in the optical signals over the optically-switched communication network 22 responsively to the data of timeslots in which respective optical circuit connections associated with respective destinations will be established. For example, one optical circuit connection to destination 1 may be established in timeslot 1 and one optical circuit connection to destination 2 may be established in timeslot 2. Therefore, the device controller 28 is configured to send the packets for destination 1 in timeslot 1 and the packets for destination 2 in timeslot 2.

Sub-steps of the step of block 74 are now described with reference to blocks 76-80.

The device controller 28 is configured to receive (block 76) the acknowledgment or timeslot data about the optical circuit connection(s) from the controller agent 30.

In embodiments where the acknowledgment of the establishment of an optical circuit connection is received, the device controller 28 is configured to retrieve (block 78) packets with destinations for that optical circuit connection from the memory 36 based on the pointers in the context memory 34.

In embodiments where timeslot data is received, the device controller 28 is configured to retrieve (block 78) packets according to the timeslots of optical circuit connections having destinations matching packet destinations. The device controller 28 is configured to retrieve packets from the memory 36 (based on the pointers in the context memory 34) shortly before the time of the respective timeslots of the respective optical circuit connections on which the packets will be sent. The packets are retrieved from memory to give enough time for the packets to be encapsulated, buffered and modulated and undergo any other transmission processing.

The device controller 28 is configured to add (block 80) timestamps to the packets and send the packets for encapsulation and other transmission processing. The added timestamps may be used by the packet buffer 38 to time when the packets are released from the packet buffer 38 to the network interface port 26. A preamble, delimiter and a header with extra information may be added by the packet encapsulation and processing engine 44.

Figure 5:
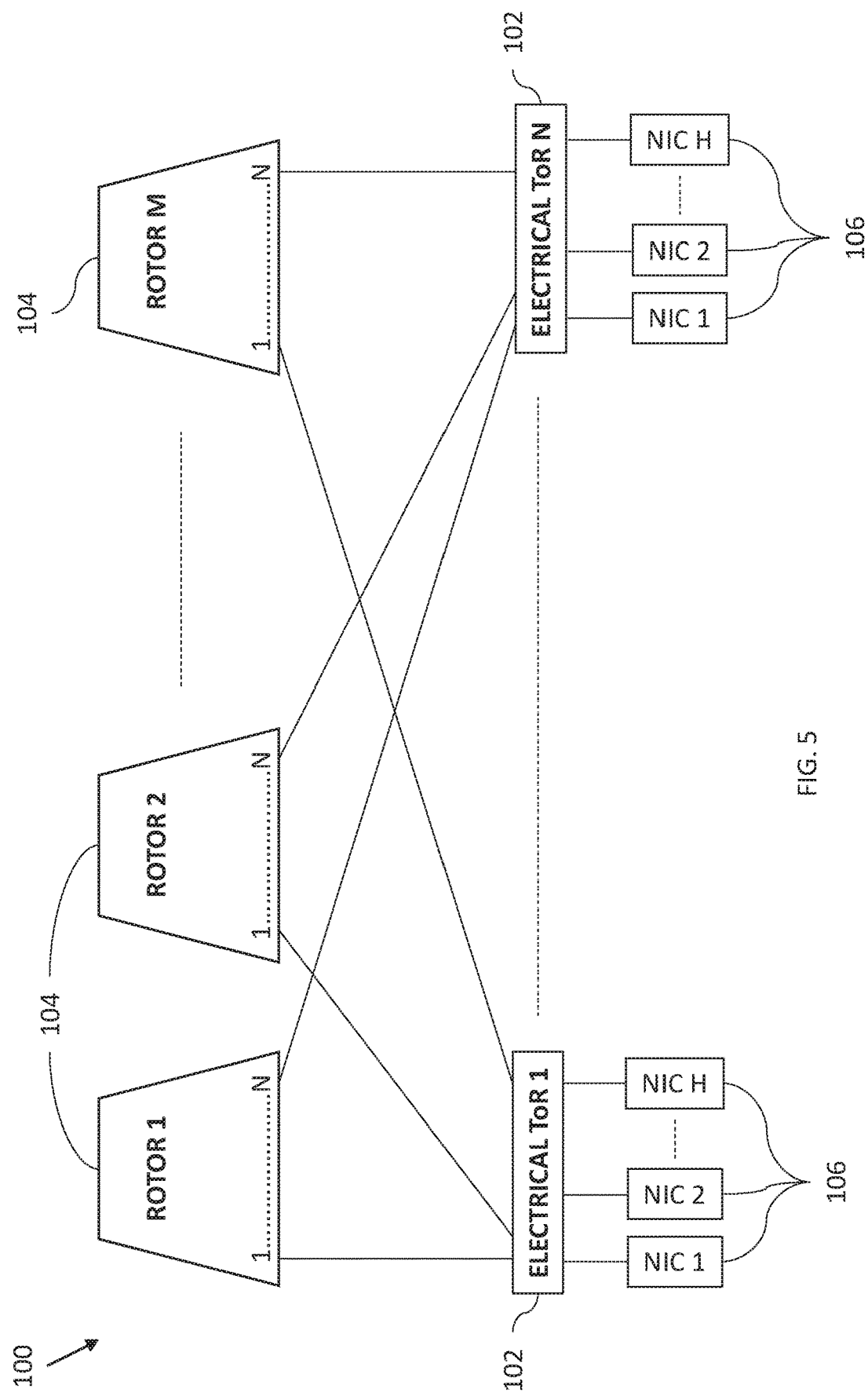
FIG. 5 is a block diagram view of a rotor network using electrical Top-of-Rack (ToR) switches.

Reference is now made to FIG. 5, which is a block diagram view of a rotor network 100 using electrical ToR switches 102. A rotor network similar to the rotor network 100, is described by Mellette et al., in "Rotornet: A scalable, low-complexity, optical datacenter network," in Proceedings of the Conference of the ACM Special Interest Group on Data Communication, SIGCOMM '17 (New York, N.Y., USA: ACM, 2017), pp. 267-280.

The rotor network 100 uses the electrical ToR switches 102 for traffic aggregation from multiple electrical NICs 106. Implementation of the rotor network 100 is based on a fixed schedule and employs optical rotor switches 104 that implement N fixed permutations (instead of N! (N factorial) for all permutations). Thus, the rotor network 100 eliminates a central scheduling bottleneck and allows the fabrication of switches with higher radix and faster switching times. The design of a switch that implements N permutations is much simpler than a switch that needs to implement N! permutations. The network 100 operates according to TDMA.

The remaining issue is the scalability of the ToR electrical switches 102. Optical rotor switches 104 implement a subset of the possible permutations and provide connectivity among the electrical ToRs 102. The schedule is fixed, and thus the ToRs 102 know a-priori the provided connectivity for any given timeslot, but there is no coordination among them. Thus, on the receiving side (a) the routing of the packets to specific hosts is implemented on the electrical switch 102, and (b) if two packets destined to the same host arrive at the same time, the rotor network 100 relies on the buffering of the electrical switch 102 to avoid collisions. Similarly, at the transmitting side (a) routing of the packets coming from the NICs 106 to the designated inputs of the optical rotor switches 104 is implemented on the electrical switches 102, and (b) if two packets destined to the same input of the optical rotor switch 104 arrive at the same time, the rotor network 100 relies on the buffering of the electrical switches 102 to avoid collisions.

Figure 6:
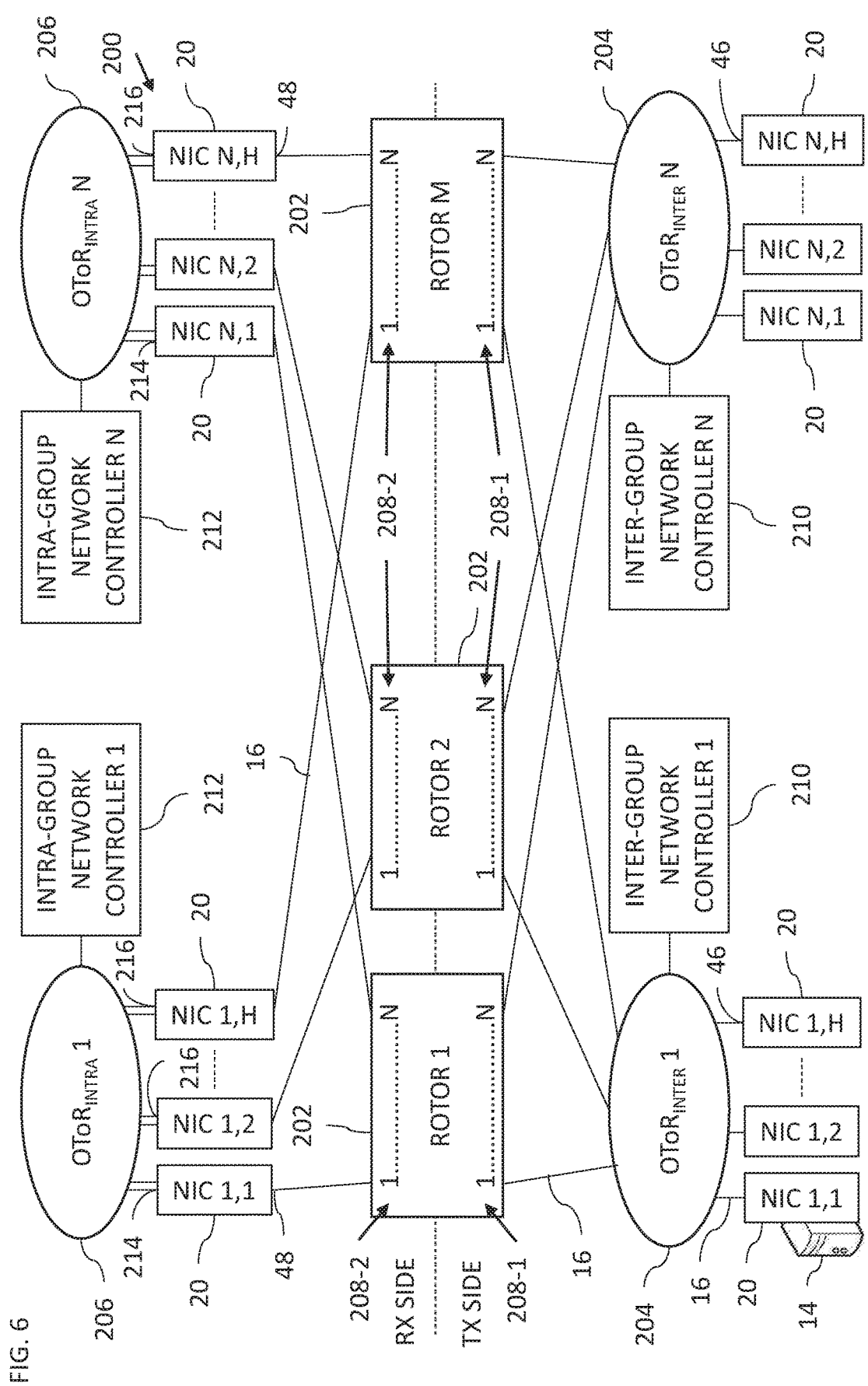
FIG. 6 is a block diagram view of an optical network system including rotor switches and optical ToR switches constructed and operative in accordance with an embodiment of the present invention.

Reference is now made to FIG. 6, which is a block diagram view of an optical network system 200 including optical rotor switches 202 and inter-group optical ToR switches 204, and intra-group optical ToR switches 206 constructed and operative in accordance with an embodiment of the present invention. The optical rotor switches 202 operate according to a fixed switching schedule (implementing a specific set of permutations, and then circling through the permutations) and therefore requests from all the optical NICs 20 do not need to be collected into a centralized network controller 18 and electrical ToR switches may be replaced with the inter-group optical ToR switches 204 and the intra-group optical ToR switches 206 as described in more detail below.

Each optical rotor switch 202 includes N input ports 208-1 and N output ports 208-2, and is configured to implement a respective set of permutations of connections between the N input ports 208-1 and the N output ports 208-2. There may be different sets of permutations of connections between ports 208 for different optical rotor switches 202 or the same set of permutations may be used by two or more of the optical rotor switches 202.

The inter-group optical ToR switches 204 are connected to the input ports 208-1 of the rotor switches 202. The inter-group optical ToR switches 204 may be connected to the rotor switches in a Clos topology or any suitable topology.

Each inter-group optical ToR switch 204 is also connected to the optical NICs 20 of a respective group of host computers 14 (only one shown in FIG. 6 for the sake of simplicity) via respective optical fibers 16. In other words, different inter-group optical ToR switches 204 are connected to different groups of optical NICs 20. For the sake of simplicity not all the optical NIC 20 and optical fibers 16 are labeled in FIG. 6.

The optical NICs 20 include respective optical transmitters 46 (only some labeled for the sake of simplicity) and optical receivers 48 (only some labeled for the sake of simplicity). For the sake of clarity, each optical NIC 20 is shown twice in FIG. 6, one at the bottom of FIG. 6 representing the transmission side of the NIC 20 and one at the top of FIG. 6 representing the receiving side of the NIC 20.

Each inter-group optical ToR switch 204 is connected to the optical transmitters 46 of the optical NICs 20 of the respective group of the host computers 14 via the respective ones of the optical fibers 16. In other words, each inter-group optical ToR switch 204 is connected to the optical transmitters 46 of its group of optical NICs 20.

Each optical rotor switch 202 is directly connected (without any intervening switches) using respective ones of the output ports 208-2 to the optical receivers 48 of respective ones of the optical NICs 20 thereby avoiding collisions. The optical rotor switches 202 may be connected to the optical receivers 48 in any suitable topology. In the example of FIG. 6 each optical rotor switch 202 is connected to one optical receiver 48 of one optical NIC 20 in each group, so that each optical rotor switch 202 is connected to all the groups.

The inter-group optical ToR switches 204 are generally different switches (but may be the same type of switch) than the intra-group optical ToR switches 206. Each intra-group optical ToR switch 206 connects the optical NICs 20 of a respective group of the host computers 14 via respective ones of the optical fibers 16. In other words, each intra-group optical ToR switch 206 connects the optical NICs 20 of a different group together to form an intra-group network so that each group of optical NICs 20 is connected together by its own intra-group optical ToR switch 206.

The optical network system 200 includes inter-group network controllers 210 associated with respective groups of the host computers 14 and respective ones of the inter-group optical ToR switches 204. In other words, each inter-group optical ToR switch 204 is associated with its own inter-group network controller 210. The optical network system 200 also includes intra-group network controllers 212 associated with the respective groups of the host computers 14 and respective ones of the intra-group optical ToR switches 206. In other words, each intra-group optical ToR switch 206 is associated with its own intra-group network controller 212. The inter-group network controllers 210 and the intra-group network controllers 212 prevent collisions by correctly scheduling the respective inter-group optical ToR switches 204 and intra-group optical ToR switches 206 and coordinating the transmission of packets from the host computers 14 in the respective group. For example, each inter-group network controller 210 schedules its associated inter-group optical ToR switch 204 and each intra-group network controller 212 schedules its associated intra-group optical ToR switch 206. The inter-group network controllers 210 and the intra-group network controllers 212 do not pose a scalability barrier since they address a small subset of hosts 14. The inter-group network controllers 210 and the intra-group network controllers 212 may implement an appropriate scheduling algorithm taking into account the load of the NICs 20. Examples of scheduling algorithms that may be implemented include iSLIP, LQF (longest queue first), First-Come-First-Served, or speculative transmissions.

In practice, some or all of the functions of the inter-group network controllers 210 and the intra-group network controllers 212 may be combined in a single physical component or, alternatively, implemented using multiple physical components. These physical components may comprise hard-wired or programmable devices, or a combination of the two. In some embodiments, at least some of the functions of the inter-group network controllers 210 and the intra-group network controllers 212 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Depending on the requirements of the optical network system 200 and the applications, the inter-group optical ToR switches 204 and/or the intra-group optical ToR switches 206 may be similar to the optical rotor switches 202, rotating through a specific set of port matchings. In these embodiments, the inter-group network controllers 210 and the intra-group network controllers 212 may not be needed, since each NIC 20 knows the matching per timeslot and transmits the appropriate packets at the correct times.

In the pictured topology of FIG. 6, the NICs 20 that belong to one group can only send a packet flow to a specific subset of the total NICs 20 that belong to other groups. This results from the facts that (a) the receivers 48 of the NICs 20 are directly connected to the optical rotor switches 202 and (b) each optical rotor switch 202 implements a subset of the shift permutations. In particular, each inter-group optical ToR switch 204 can reach N NICs (of the total N multiplied by H) as each inter-group optical ToR switch 204 is connected to M optical rotor switches 202, and each optical rotor switch 202 implements N/M permutations. By providing appropriate fixed connections, it is possible for each inter-group optical ToR switch 204 to have direct connectivity with N NICs 20 that belong to N distinct groups and thus, each group is directly connected to any other group.

Each NIC 20 includes an additional optical transmitter 214 (only some labeled for the sake of simplicity) and optical receiver 216 (only some labeled for the sake of simplicity) connected to the respective intra-group optical ToR switch 206. In other words, the optical transmitter 214 and the optical receiver 216 of each optical NIC 20 are connected to the intra-group optical ToR switch 206 of the group of that optical NIC 20. Each intra-group optical ToR switch 206 may be associated with a control plane network. Packets received from the respective optical rotor switch 202 are either kept at the NIC 20 and forwarded to the NIC's host 14 or forwarded (for example based on IP destination address or VLAN) to the optical transmitter 214 for forwarding via the respective intra-group optical ToR switch 206 to one of the optical receivers 216 of one of the optical NIC's 20 in the same group. The forwarding may be performed by either directly pushing packets to a hardware queue that belongs to the port of the respective intra-group optical ToR switch 206 or through appropriate handling in the NIC's memory (DRAM/SRAM). While the packets are awaiting forwarding, they are stored in the memory 36 or any other suitable storage medium. Routing and arbitration for the network of the intra-group optical ToR switch 206 may be performed using any suitable method, for example: (a) using rotor-like logic, (b) using a local scheduler (e.g., the intra-group network controller 212) based on the requests for intra-group communication, or (c) with an electrical switch shared among k ToRs as described in more detail with reference to FIG. 13. Option (c) reduces the Rotornet electrical switches by a factor k, while facilitating co-existence with an electrical network that would serve latency-sensitive traffic.

The introduction of the intra-group optical ToR switches 206 replaces the electrical ToR switches and provides extra bandwidth to cope with the intra-group network bottleneck. The functions of the electrical ToR switches are now distributed at the NICs 20 (for example, by queuing and scheduling packet transmission) and the intra-group optical ToR switches 206. Additional wavelengths and extra receivers may be used to multiply the bandwidth. The optical network system 200 also allows efficient use of Valiant Load Balancing (VLB) and modified VLB. An example of VLB is described in the above-mentioned paper by Mellette et. al.

The frame size of the intra-group network may be smaller than or equal to the Rotornet frame size. Shorter intra-group frames may provide the capability to reach multiple NIC destinations from a single source during a Rotornet slot.

The optical network system 200 shown in FIG. 6 may support co-existence with an electrical network that may be used for latency-sensitive traffic. In this case, k ports of each inter-group optical ToR switch 204 and the respective k NIC receivers 48 may be connected to the legacy electrical network.

In the embodiments described above, each port may carry more than one optical lane in order to scale the port bandwidth. The optical lanes may be wavelength division multiplexed (WDM) and carried on a single fiber, or space division multiplexed (SDM) and carried on multiple parallel fibers (e.g., fiber bundles) or multi-core fibers. The implementation of the optical network system 200 may follow the type of multiplexing implemented in the network. For example, in the case of WDM, multiple wavelengths that belong to a single port may be routed simultaneously in the optical switch, whereas in the case of SDM, multiple optical switches operating with the same switching schedule are deployed in parallel, serving all of the SDM lanes that constitute a port.

Figures 7, 8:
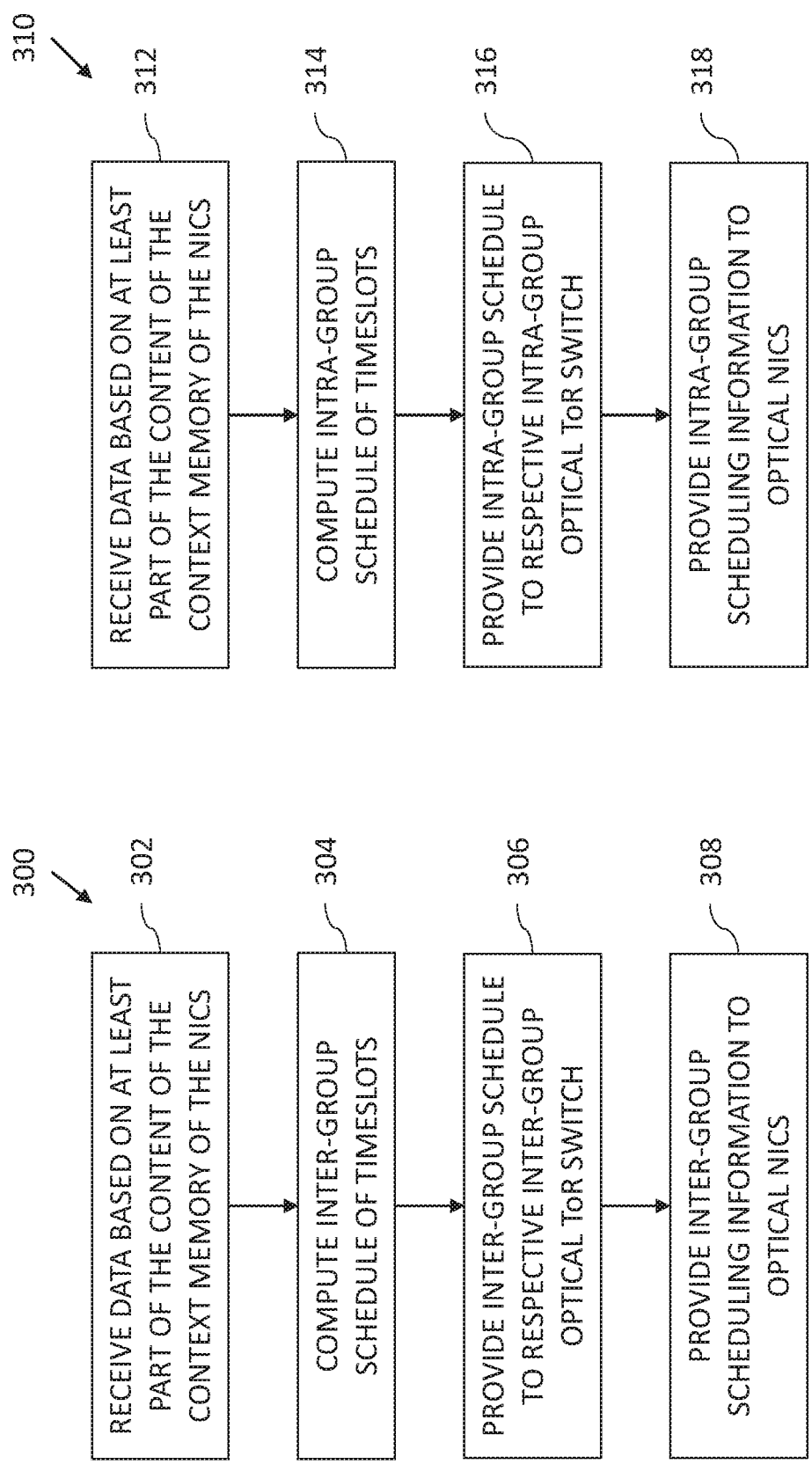
FIG. 7 is a flowchart including steps in a method of operation of an inter-group network controller in the system of FIG. 6.
FIG. 8 is a flowchart including steps in a method of operation of an intra-group network controller in the system of FIG. 6.

Reference is now made to FIG. 7, which is a flowchart 300 including steps in a method of operation of one of the inter-group network controllers 210 in the system 200 of FIG. 6. Reference is also made to FIG. 6. The inter-group network controller 210 is configured to receive (block 302) data based on the content (or part thereof) of the context memory 34 of some or all of the NICs 20 in that group. The inter-group network controller 210 is configured to compute (block 304) a schedule (e.g., an inter-group schedule) of time slots of optical circuit connections from some or all of the optical NICs of a respective group of the host computers 14 (i.e., the host computer 14 in the group of the inter-group network controller 210) via a respective inter-group optical ToR switch 204 (i.e., the inter-group optical ToR switch 204 of the inter-group network controller 210), responsively to switching schedules of some or all of the optical rotor switches 202 (e.g., rotor switch switching schedules) and data of queued packets in some or all of the optical NICs 20 of the respective group of the host computers 14.

The inter-group network controller 210 is configured to provide (block 306) the respective inter-group schedule to the respective inter-group optical ToR switch 204. The inter-group network controller 210 is configured to provide (block 308) respective scheduling information (e.g., the respective inter-group schedule) to ones of the optical NICs 20 (e.g., respective ones of the optical NiCs in the group of the inter-group network controller 210) of the respective group of the host computers 14 responsively to the schedule (e.g., the respective inter-group schedule). The inter-group network controller 210 may send data relevant to each optical NIC 20 or may send the schedule (e.g., inter-group schedule) relevant to all the optical NICs 20 to each optical NIC 20.

Reference is now made to FIG. 8, which is a flowchart 310 including steps in a method of operation of one of the intra-group network controllers 212 in the system 200 of FIG. 6. Reference is also made to FIG. 6.

The intra-group network controller 212 is associated with a respective one of the intra-group optical ToR switches 206 and a respective group of optical NICs 20 and host computers 14. The intra-group network controller 212 is configured to receive (block 312) data based on the content (or part thereof) of the context memory 34 of some or all of the optical NICs 20 in the respective group.

The intra-group network controller 212 is configured to compute (block 314) a respective intra-group schedule of time slots of the optical circuit connections among the optical NICs 20 of the respective group of the host computers 14 via the respective intra-group optical ToR switch 206 responsively to data of queued packets in the some or all of the optical NICs 20 of the respective group of the host computers 14. The intra-group network controller 212 is configured to provide (block 316) the respective intra-group schedule to the respective intra-group optical ToR switch 206. The intra-group network controller 212 is configured to provide (block 318) respective intra-group scheduling information to ones of the optical NICs 20 of the respective group of the host computers 14 responsively to the respective intra-group schedule. The intra-group network controller 212 may send data relevant to each optical NIC 20 or may send the schedule (e.g., intra-group schedule) relevant to all the optical NICs 20 to each optical NIC 20.

Figure 9:
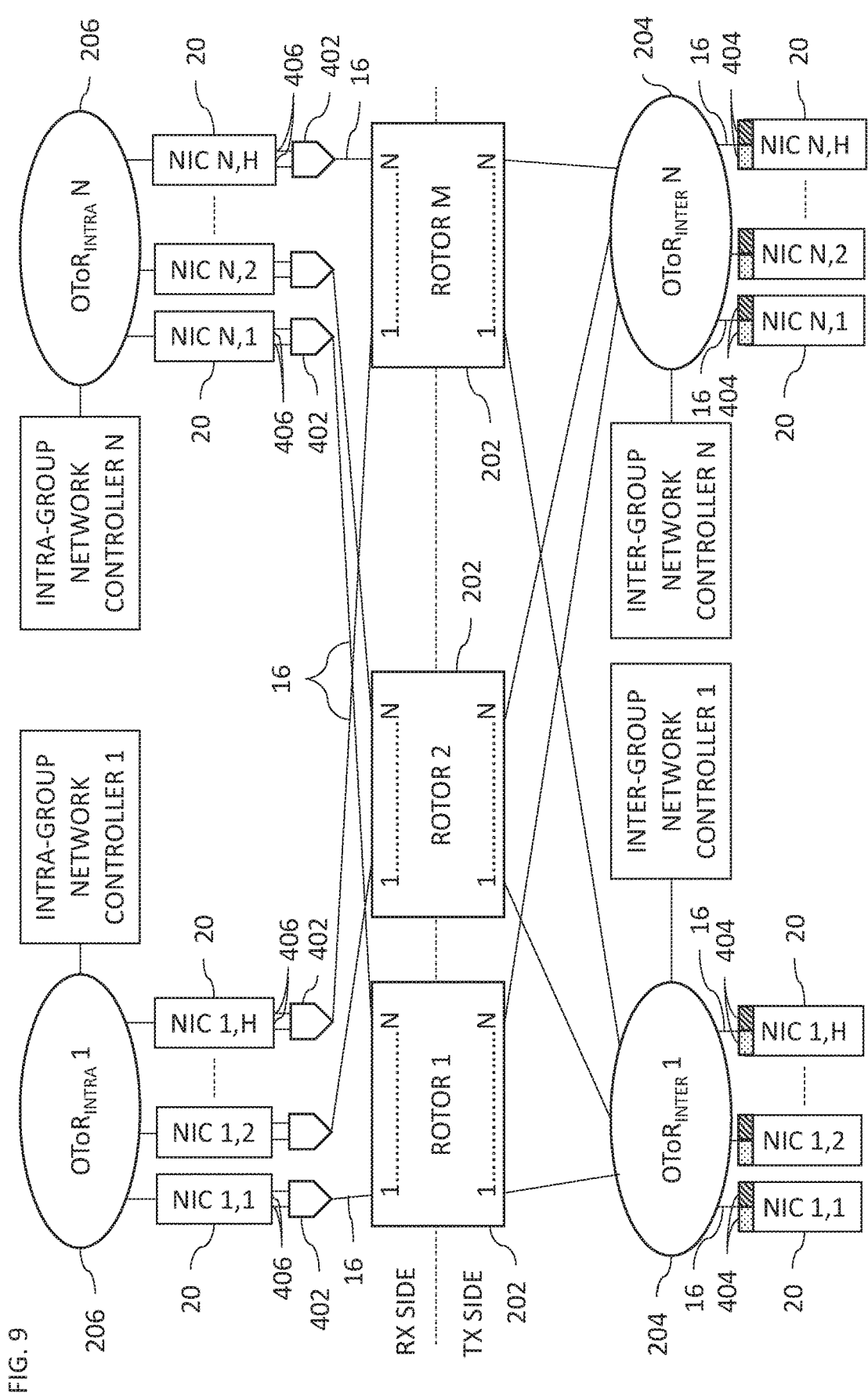
FIG. 9 is a block diagram view of an optical network system using different transmission wavelengths constructed and operative in accordance with an embodiment of the present invention.

Reference is now made to FIG. 9, which is a block diagram view of an optical network system 400 using different transmission wavelengths constructed and operative in accordance with an embodiment of the present invention.

VLB may be used to achieve good utilization of available bandwidth for different traffic patterns. In VLB, instead of transmitting the packets to the destination, the source first forwards the traffic to a random intermediate node (indirect traffic). Then, the intermediate node forwards the traffic to the final destination (direct traffic). One solution to implement VLB is to divide each timeslot for direct traffic and indirect traffic. Clearly, half of the network's bandwidth is "wasted" in sending data to intermediate nodes. It may be argued that in optical networks there is a lot of bandwidth, which can be "wasted" in order to accommodate bursty and skewed traffic patterns.

The optical network system 400 provides a system for forwarding packets at different wavelengths, so that one wavelength is used for forwarding packets from sources to intermediate nodes (indirect traffic) and a different wavelength is used for forwarding from packets from intermediate nodes to destination nodes (direct traffic). The optical network system 400 therefore uses wavelength-based VLB. However, the optical network system 400 may be implemented using any suitable routing scheme where direct and indirect traffic is forwarded at respective different wavelengths.

The optical network system 400 is substantially the same as the optical network system 200 of FIG. 6 apart from the following differences.

Each optical NIC 20 (only some labeled for the sake of simplicity) includes two optical transmitters 404 (only some labeled for the sake of simplicity) and two optical receivers 406 (only some labeled for the sake of simplicity) (in addition to the optical transmitter(s) 46 and optical receiver (s) 48 of FIG. 6) to respectively transmit and receive optical signals with two different wavelengths. In other words, one of the optical transmitters 404 and one of the optical receivers 406 operates at one wavelength and another one of the optical transmitters 404 and optical receivers 406 operates at a different wavelength. One of the wavelengths is used for direct connections (e.g., direct traffic) and one of the wavelengths is used for indirect connections (e.g., indirect traffic) in a load balancing scheme (e.g., VLB). The two optical transmitters 404 of each optical NIC 20 may be connected by a single optical fiber 16 (only some labeled for the sake of simplicity) to the respective inter-group optical ToR switch 204.

On the receiver (RX) side, the optical network system 400 includes a plurality of optical wavelength routers 402 (e.g., optical multiplexers such as arrayed waveguide gratings) associated with respective optical NICs 20. Only some of the optical wavelength routers 402 are labeled for the sake of simplicity. The inputs of the optical wavelength routers 402 are connected to the optical rotor switches 202 and the outputs of the optical wavelength router 402 are connected to the optical receivers 406. Each optical wavelength router 402 includes: an input connected to a respective one of the optical fibers 16 (which is connected to one of the optical rotor switches 202); and two outputs respectively connected to the two optical receivers 406 of a respective one of the optical NICs 20. The optical wavelength router 402 is configured to separate the optical signals with the two different wavelengths received from the respective optical fiber 16 for separate transmission into to the respective optical receivers 406 of the respective optical NIC 20 responsively to the different wavelengths of the optical signals. In other words, the respective optical fiber 16 forwards two signals with two different wavelengths to the optical wavelength router 402, which separates the two signals and separately forwards them to the two optical receivers 406 according to the wavelengths of the signals. In some embodiments, the optical NICs 20 transmit signals to, and receive signals from, the respective intra-group optical ToR switch 206 using a single wavelength as there is no indirect traffic in the intra-group network.

Figure 10:
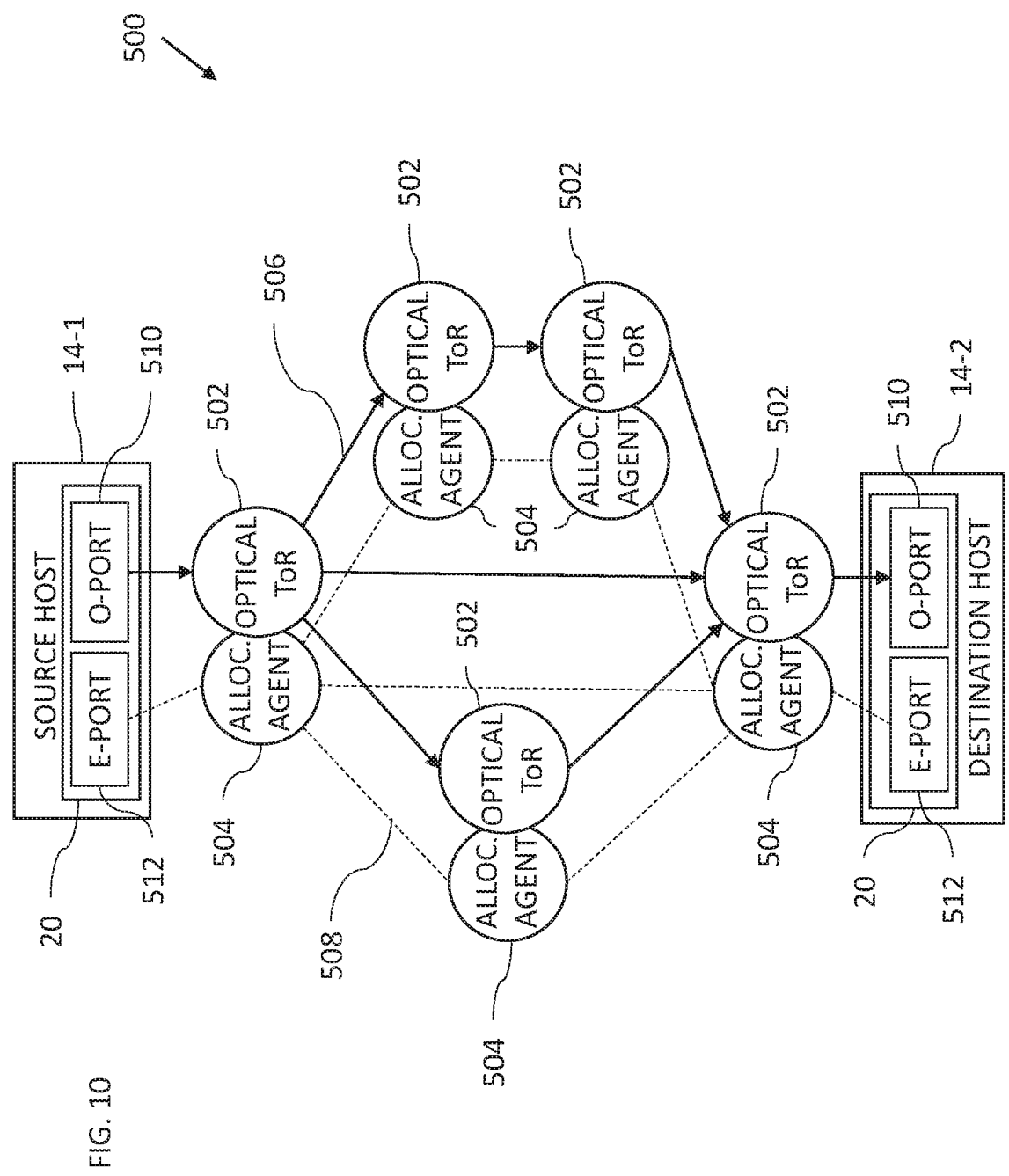
FIG. 10 is a block diagram view of an optical network system including optical ToR switches and allocation agents constructed and operative in accordance with an embodiment of the present invention.

Reference is now made to FIG. 10, which is a block diagram view of an optical network system 500 including optical ToR switches 502 and associated allocation agents 504 constructed and operative in accordance with an embodiment of the present invention. The optical network system 500 provides an optically-switched communication network 506 (solid lines) for forwarding packets in optical signals over optical circuit connections via the optical ToR switches 502 (or any other suitable optical switch), while using the allocation agents 504 over a network 508 (dotted lines) (e.g., an electrical network) to negotiate the optical circuit connections. The allocation agents 504 may be implemented using low-bandwidth electrical switches. The network 508 generally has the same topology as the optically-switched communication network 506 of the optical network system 500. In some embodiments, the allocation agents 504 are connected via a packet-switched network, which has the same topology as the optically-switched communication network 506. The bandwidth of the allocation agents 504 may be selected according to the data which needs to be exchanged among the network of the allocation agents 504 described in more detail with reference to FIGS. 11 and 12.

The optical network system 500 may thought of as an optical Xpander network. By way of example, electrical Xpander networks are described by Valadarsky et al. in "Xpander: Unveiling the secrets of high-performance datacenters," in Proceedings of the 14th ACM Workshop on Hot Topics in Networks, HotNets-XIV (New York, N.Y., USA: ACM, 2015), pp. 16:1-16:7.

FIG. 10 shows two host computers 14 including respective optical NICs 20. Each optical NIC 20 includes an optical network interface port 510 and an electrical network interface port 512, for interfacing with the optical ToR switches 502, and the allocation agents 504, respectively. Each optical ToR switch 502 is connected to at least one other optical ToR switch 502 and optically directly to one of the host computers 14. FIG. 10 shows that there are various paths by which packets from a source host computer 14-1 may be forwarded to a destination host computer 14-2 via the optical ToR switches 502.

The host computer 14-1 stores paths that include of a sequence of hops for reaching other host computers 14. When the source host computer 14-1 needs to send packets to the destination host computer 14-2, the source host computer 14-1 generates an allocation request and sends the request to the allocation agent 504 at the next hop, which may be found from the stored paths, through the network 508. Each allocation agents 504 knows the state of its associated optical ToR switch 502 and can either accept or reject the request. The process is repeated for each hop of the path until either the request fails or the request reaches the destination allocation agent 504 successfully. In both cases (success or failure) the source host computer 14-1 receives an acknowledgment (either success or failure) and acts accordingly. The above scheme eliminates the need for electrical ToR aggregation and central scheduling by using the optical ToR switches 502 with local scheduling.

Reference is now made to FIG. 11, which is a flowchart 520 including steps in a method of operation of the NIC device 20 of the source host computer 14-1 in the system 500 of FIG. 10. Reference is also made to FIG. 10. The optical NIC 20 of the source host computer 14-1 is configured to send (block 522) a request to at least one of the allocation agents 504 to establish an optical circuit connection to the optical NIC 20 of the destination host computer 14-2. The optical NIC 20 of the source host computer 14-1 is configured to receive (block 524) an acknowledgment from one of the allocation agents 504 responsively to the optical circuit connection being established. The optical NIC 20 of the source host computer 14-1 is configured to send (block 526) an optical signal responsively to the received acknowledgment along the established optical circuit connection.

Reference is now made to FIG. 12, which is a flowchart 530 including steps in a method of operation of the allocation agent(s) 504 in the system 500 of FIG. 10. Reference is also made to FIG. 10. The allocation agent(s) 504 is (are) configured to receive (block 532) the request from the optical NIC 20 of the source host computer 14-1. The same request may be propagated along the paths from the source host computer 14-1 or each allocation agent 504 may generate a new request based on the request received from the source host computer 14-1 or from another one of the allocation agents 504. Respective ones of the allocation agents 504 are configured negotiate and establish (block 534) an optical circuit connection from the optical NIC 20 of the source host computer 14-1 to the optical NIC 20 of the destination host computer 14-2 via respective ones of the optical switches 502. The negotiation may include the allocation agents 504 being configured to propagate (block 536) the connection request via the allocation agents 504 until the request meets with failure or success at the destination allocation agent 504. One or more of the allocation agents 504 are configured to send (block 538), to the optical NIC 20 of the source host computer 14-1, an acknowledgment that the optical circuit connection has been established.

Figure 13:
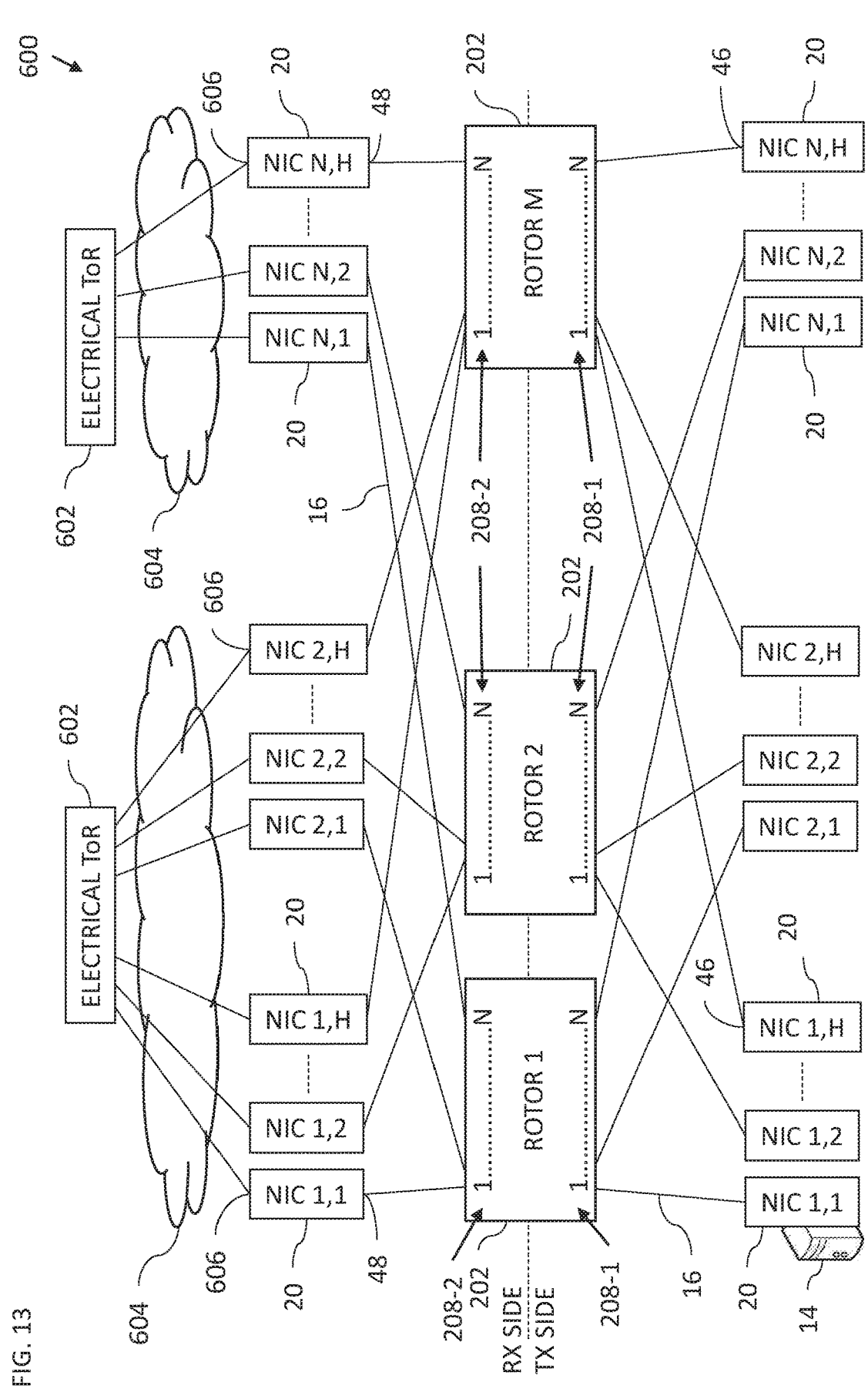
FIG. 13 is a block diagram view of a hybrid optical-electrical network system constructed and operative in accordance with an embodiment of the present invention.

Reference is now made to FIG. 13, which is a block diagram view of a hybrid optical-electrical network system 600 constructed and operative in accordance with an embodiment of the present invention.

The hybrid optical-electrical network system 600 includes a plurality of the optical rotor switches 202 (only three shown for the sake of simplicity) and a plurality of electrical ToR switches 602 (only two shown for the sake of simplicity). The hybrid optical-electrical network system 600 may include any suitable number of optical rotor switches 202 and electrical ToR switches 602.

Each rotor switch 202 is connected to the optical transmitters 46 (only some labeled for the sake of simplicity) of respective ones of the optical NICs 20 (only some labeled for the sake of simplicity), and to optical receivers 48 (only some labeled for the sake of simplicity) of respective ones of the optical NICs 20.

Each electrical ToR switch 602 connects the optical NICs 20 of respective groups of the host computers 14 via a respective packet-switched network 604 (only two shown for the sake of simplicity). The network interface port 26 (FIG. 1) of each optical NIC 20 also includes a packet-switched network enabled port 606 (only some labeled for the sake of simplicity) for connection to the respective electrical ToR switch 602. Each electrical ToR switch 602 may connect two or more groups of the host computers 14. Each group of host computers 14 may correspond with host computers disposed in the same respective rack.

For example, packets may be forwarded from one of the optical NICs 20 via its optical transmitter 46 to one of the input ports 208-1 of one of the optical rotor switches 202. The transmission is scheduled according to the respective switching schedules of the optical rotor switches 202 and the desired intermediate or final destination of the packets. The packets are then forwarded within that optical rotor switch 202 to one of the output ports 208-2 of that optical rotor switch 202 according to a current switching permutation of that optical rotor switch 202. The packets are then forwarded to the optical receiver 48 of the optical NIC 20 (referred to as the "receiving" optical NIC 20 below) which is connected to the output port 208-2 from which the packets were forwarded. The packets may be forwarded by the receiving optical NIC 20 to the electrical ToR switch 602 of the packet-switched network 604 connected to the port 606 of the receiving optical NIC 20. That electrical ToR switch 602 then forwards the packets to one of the optical NICs 20 in that packet-switched network 604 according to the intermediate or final destination of the packets.

Packets may be forwarded by one packet-switched network 604 and then via one optical rotor switch 202 to the desired intermediate or final destination of the packets. Alternatively, packets may be forwarded via one optical rotor switch 202 and then via one packet-switched network 604 to the desired intermediate or final destination of the packets.

One advantage of the hybrid optical-electrical network system 600 may be appreciated by a comparison with the rotor network 100 of FIG. 5. In the rotor network 100 of FIG. 5, if H and M is equal to 32 and N is equal to 125, the rotor network 100 may be used to connect 4000 host computers 14 via "125" electrical ToR switches 102 and 32 optical rotor switches 104, where each electrical ToR switch 102 has a radix of 2 times H, which in this example equals 64. In the hybrid optical-electrical network system 600, if H and M are equal to 32 and N is equal to 125, the hybrid optical-electrical network system 600 may be used to connect 4000 host computers 14 via "63" electrical ToR switches 602 with a radix of 64. Therefore, the hardware cost and the energy consumption of the hybrid optical-electrical network system 600 is significantly less than the rotor network 100 of FIG. 5.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. An optical network system, comprising:
    a plurality of optical switches configured to switch beams of light which are modulated to carry information;
    a plurality of optically-enabled end-host computers comprising respective end-host optical network interface controllers (NICs), each of the optically-enabled end-host computers comprising a respective one of the end-host optical NICs; and
    optical fibers connecting the end-host optical NICs and the optical switches forming an optically-switched communication network, over which optical circuit connections are established between pairs of the end-host optical NICs over ones of the optical fibers via ones of the optical switches, the optically-switched communication network including the end-host optical NICs and the optical switches,
    and wherein the optical switches include ports, each of the NICs being connected by a respective one of the optical fibers to a respective one of the ports of the optical switches without even one intervening electrical switch;
    and wherein each of the optical NICs comprises:
        at least one network interface port comprising at least one optical transmitter and at least one optical receiver configured to be connected to the optically-switched communication network;
        a controller agent configured to: negotiate, with a network controller, establishment of the optical circuit connections from a respective one of the NIC devices over the optically-switched communication network; and receive data about establishment of the optical circuit connections from the network controller; and
        a device controller configured to: manage queueing of packets awaiting transmission over the optically-switched communication network; and manage sending the packets in optical signals from the at least one optical transmitter over the optically-switched communication network responsively to the data about the establishment of the optical circuit connections.

2. The system according to claim 1, further comprising at least one network controller configured to manage establishment of the optical circuit connections.

3. The system according to claim 1, wherein the optical switches include:
    a plurality of rotor switches, each rotor switch comprising ports, and being configured to implement a respective set of permutations of connections between the ports; and
    a plurality of inter-group optical top of rack (ToR) switches connected to the rotor switches, each inter-group optical ToR switch also being connected to the optical NICs of a respective group of the host computers via respective ones of the optical fibers.

4. The system according to claim 3, further comprising at least one network controller configured to:
    compute a schedule of time slots of ones of the optical circuit connections responsively to switching schedules of ones of the rotor switches and data of queued packets in ones of the optical NICs; and
    provide respective scheduling information to respective ones of the optical NICs responsively to the schedule.

5. The system according to claim 3, wherein:
    the optical NICs comprise respective optical transmitters and optical receivers;
    each inter-group optical ToR switch is connected to the optical transmitters of the optical NICs of the respective group of the host computers via the respective ones of the optical fibers;

each rotor switch is connected to the optical receivers of respective ones of the optical NICs;

the optical switches include a plurality of intra-group optical ToR switches different from the plurality of inter-group optical ToR switches; and each intra-group optical ToR switch connects the optical NICs of a respective group of the host computers via respective ones of the optical fibers.

6. The system according to claim 5, wherein the inter-group optical ToR switches are connected to the rotor switches in a Clos topology.

7. The system according to claim 5, further comprising inter-group network controllers associated with respective groups of the host computers and respective ones of the inter-group optical ToR switches, each inter-group network controller being configured to:

compute a respective inter-group schedule of time slots of the optical circuit connections from ones of the optical NICs of a respective one of the groups of the host computers via a respective one of the inter-group optical ToR switches responsively to rotor switch switching schedules and data of queued packets in the ones of the optical NICs of the respective group of the host computers;

provide the respective inter-group schedule to the respective inter-group optical ToR switch; and provide respective inter-group scheduling information to ones of the optical NICs of the respective group of the host computers responsively to the respective inter-group schedule.

8. The system according to claim 7, further comprising intra-group network controllers associated with the respective groups of the host computers and respective ones of the intra-group optical ToR switches, each intra-group network controller being configured to:

compute a respective intra-group schedule of time slots of the optical circuit connections among the optical NICs of a respective one of the groups of the host computers via a respective one of the intra-group optical ToR switches responsively to data of queued packets in the ones of the optical NICs of the respective group of the host computers;

provide the respective intra-group schedule to the respective intra-group optical ToR switch; and provide respective intra-group scheduling information to ones of the optical NICs of the respective group of the host computers responsively to the respective intra-group schedule.

9. The system according to claim 5, wherein each optical NIC includes a device controller configured to:

manage queuing of packets awaiting transmission over the optically-switched communication network; and manage sending the packets in optical signals over the optically-switched network responsively to data about establishment of the optical circuit connections.

10. The system according to claim 1, wherein each of the optical NICs comprises two optical transmitters and two optical receivers to respectively transmit and receive optical signals with two different wavelengths, one of the wavelengths being used for direct connections and one of the wavelengths for indirect connections in a load balancing scheme.

11. The system according to claim 10, further comprising a plurality of optical wavelength routers associated with respective ones of the optical NICs, each optical wavelength router including an input connected to a respective one of the optical fibers and two outputs respectively connected to the two optical receivers of a respective one of the optical NICs, and being configured to separate the optical signals with the two different wavelengths received from the respective optical fiber for separate transmission into to the respective ones of the optical receivers of the respective optical NIC responsively to the different wavelengths of the optical signals.

12. The system according to claim 1, further comprising a plurality of allocation agents associated with respective ones of the optical switches, wherein:

a first one of the optical NICs is configured to send a request to at least one of the allocation agents to establish an optical circuit connection to a second one of the optical NICs;

respective ones of the allocation agents are configured negotiate and establish an optical circuit connection from the first optical NIC to the second optical NIC via respective ones of the optical switches;

the first optical NIC is configured to receive an acknowledgment from one of the allocation agents responsively to the established optical circuit connection; and the first optical NIC is configured to send an optical signal responsively to the received acknowledgment.

13. The system according to claim 12, wherein the allocation agents are connected via a packet-switched network, which has a same topology as the optically-switched communication network.

14. The system according to claim 1, wherein the optical NICs are configured to share a common time reference among the host computers in the optically-switched communication network.

15. The system according to claim 1, further comprising a plurality of electrical top of rack (ToR) switches, wherein:

the optical switches include a plurality of rotor switches, each rotor switch comprising ports, and being configured to implement a respective set of permutations of connections between the ports;

the optical NICs comprise respective optical transmitters and optical receivers;

each rotor switch is connected to the optical transmitters of respective ones of the optical NICs, and to optical receivers of respective ones of the optical NICs; and each electrical ToR switch connects the optical NICs of respective groups of the host computers via a respective packet-switched network.

16. The system according to claim 15, wherein each optical NIC includes a device controller configured to:

manage queuing of packets awaiting transmission over the optically-switched communication network; and manage sending the packets in optical signals over the optically-switched network responsively to data about establishment of the optical circuit connections.

17. An end-host optical network interface controller (NIC) device, comprising:

an interface with an end-host computer and configured to receive packets from the end-host computer;

at least one network interface port comprising at least one optical transmitter and at least one optical receiver configured to be connected to an optically-switched communication network, over which optical circuit connections from the NIC device are established, optically-switched communication network including optical switches and other optical NICs;

a device controller configured to:

manage queueing of the packets awaiting transmission over the optically-switched communication network; and manage sending the packets in optical signals from the at least one optical transmitter over the optically-switched communication network responsively to data about establishment of the optical circuit connections; and a controller agent configured to: negotiate, with at least one network controller, the establishment of the optical circuit connections from the NIC device over the optically-switched communication network; and receive the data about the establishment of the optical circuit connections from the at least one network controller; and wherein the optical switches include ports, the optical NICs being connected by optical fibers to the ports of the optical switches without intervening electrical switches.

18. The device according to claim 17, wherein:

the data about the establishment of the optical circuit connections comprises data of timeslots in which respective ones of the optical circuit connections will be established; and the device controller is configured to schedule sending the packets addressed to a plurality of destinations from the at least one optical transmitter in the optical signals over the optically-switched communication network responsively to the data of timeslots in which respective ones of the optical circuit connections associated with respective ones of the destinations will be established.

19. The device according to claim 17, further comprising a context memory configured to store pointers to memory locations of respective ones of the packets awaiting transmission, and wherein the controller agent is configured to negotiate, with the at least one network controller, the establishment of the optical circuit connections responsively to at least part of a content of the context memory, the content including at least one packet destination identification.

20. The device according to claim 17, further comprising:

time synchronization circuitry configured to maintain a clock value which is synchronized with at least one other clock value in the optically-switched communication network; and a packet buffer configured to:

buffer the packets assigned for sending over the optically-switched communication network; and time a release of the buffered packets for sending over the optically-switched communication network responsively to respective timestamps assigned to respective ones of the buffered packets by the device controller and the maintained clock value.

21. The device according to claim 17, further comprising a controller agent configured to: negotiate, with at least one network controller, the establishment of the optical circuit connections from the NIC device over the optically-switched communication network; and receive the data about the establishment of the optical circuit connections from the at least one network controller, and wherein:

the data about the establishment of the optical circuit connections comprises acknowledgments that respective ones of the optical circuit connections have been established; and the device controller is configured to manage sending the packets addressed to a plurality of destinations from the at least one optical transmitter in the optical signals over the optically-switched communication network responsively to the receiving respective ones of the acknowledgments that respective ones of the optical circuit connections associated with respective ones of the destinations have been established.

22. The device according to claim 21, further comprising a context memory configured to store pointers to memory locations of respective ones of the packets awaiting transmission, and wherein the controller agent is configured to negotiate, with the at least one network controller, the establishment of the optical circuit connections responsively to at least part of a content of the context memory, the content including at least one packet destination identification.

23. The device according to claim 17, further comprising burst clock data recovery (CDR) circuitry connected to the at least one optical receiver, and configured to extract a clock value from an incoming serial bitstream.

* * * * *